(12) United States Patent
Katanguri et al.

(10) Patent No.: US 12,737,105 B2
(45) Date of Patent: Sep. 15, 2026

(54) WELL EQUIPMENT SYSTEM CONFIGURATION FRAMEWORK

(71) Applicant: Schlumberger Technology Corporation, Sugar Land, TX (US)

(72) Inventors: Suman Katanguri, Sugar Land, TX (US); Dinesh Kumar Dhamodaran, Coimbatore (IN); Jesse Hardt, Sugar Land, TX (US); Prasadh Rajagopal, Coimbatore (IN); Manuel Francis T, Coimbatore (IN); Matthew Olson, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 252 days.

(21) Appl. No.: 18/505,308

(22) Filed: Nov. 9, 2023

(65) Prior Publication Data

US 2025/0156055 A1 May 15, 2025

(51) Int. Cl.

| | |
|---|---|
| ***G06T 11/20*** | (2026.01) |
| ***E21B 33/06*** | (2006.01) |
| ***E21B 41/00*** | (2006.01) |
| ***G06F 3/0482*** | (2013.01) |
| ***G06F 3/04847*** | (2022.01) |
| ***G06T 11/23*** | (2026.01) |

(52) U.S. Cl.

CPC .......... *G06F 3/04847* (2013.01); *E21B 33/06* (2013.01); *E21B 41/00* (2013.01); *G06F 3/0482* (2013.01); *G06T 11/23* (2026.01)

(58) Field of Classification Search

None

See application file for complete search history.

(56) References Cited

U.S. PATENT DOCUMENTS

| | | | | |
|---|---|---|---|---|
| 8,930,821 | B2 * | 1/2015 | Blackham | G06F 30/13 705/26.1 |
| 10,689,937 | B1 * | 6/2020 | Horn | E21B 33/063 |
| 2003/0156918 | A1 * | 8/2003 | Benedict | E21B 17/028 411/81 |
| 2012/0197527 | A1 | 8/2012 | McKay | |

(Continued)

FOREIGN PATENT DOCUMENTS

| | | |
|---|---|---|
| AU | 2015204064 B2 | 3/2018 |
| WO | 2023107596 A1 | 6/2023 |

OTHER PUBLICATIONS

Wygle, Peter R., Blowout Prevention in California, Equipment Selection and Testing, California Department of Conservation, Division of Oil, Gas, and Geothermal Resources, Publication No. M07, 10th edition, 2006, 25 pages.

*Primary Examiner* — Irete F Ehichioya
*Assistant Examiner* — Samuel Shen
(74) *Attorney, Agent, or Firm* — Jeffrey D. Frantz

(57) ABSTRACT

A computational framework can include a graphical user interface (GUI) generator; a logic generator; and a graphics generator, where the GUI generator generates a GUI for configuring a system of well equipment based on selections of graphical menu items, where the GUI dynamically responds to an interactive selection of one of the graphical menu items based on logic generated by the logic generator, and where the graphics generator generates a vector graphics representation of the system of well equipment as configured.

20 Claims, 20 Drawing Sheets

(56) References Cited

U.S. PATENT DOCUMENTS

| | | | | |
|---|---|---|---|---|
| 2014/0303950 | A1* | 10/2014 | Houeto | E21B 43/00 703/10 |
| 2017/0255192 | A1* | 9/2017 | Thwaites | E21B 44/00 |
| 2018/0163498 | A1* | 6/2018 | Hendel | E21B 33/038 |
| 2019/0203549 | A1 | 7/2019 | Parthasarathy | |
| 2019/0227087 | A1 | 7/2019 | Belani | |
| 2020/0274773 | A1 | 8/2020 | Mortsolf | |
| 2021/0301618 | A1 | 9/2021 | Gabaldon | |
| 2022/0195848 | A1 | 6/2022 | Olson | |
| 2022/0197490 | A1* | 6/2022 | Feinstein | E21B 7/04 |
| 2022/0222065 | A1* | 7/2022 | Tavor | G06F 8/33 |
| 2022/0335935 | A1* | 10/2022 | Lange | G06F 16/243 |
| 2024/0426705 | A1* | 12/2024 | Meraz | E21B 33/064 |
| 2025/0154866 | A1 | 5/2025 | Katanguri | |

* cited by examiner

API Arrangement A

API Arrangement RA

API Arrangement RR or Rd

1100

| Well Bore Size (WBS) | Type of Bonnet | Well Bore Size Availability | Ram 1 | Ram 2 | Ram 3 | Ram 4 | Ram 5 | Ram 6 |
|---|---|---|---|---|---|---|---|---|
| WBS 1 | Bonnet 1 | 0 | - | - | - | - | - | - |
| WBS 2 | | 1 | - | - | - | x | x | x |
| WBS 3 | | 1 | - | x | - | x | x | x |
| WBS 4 | | 1 | - | - | - | x | x | x |
| WBS 5 | | 1 | - | - | - | x | x | x |
| WBS 6 | | 1 | - | - | - | x | x | x |
| WBS 7 | | 1 | - | - | - | x | x | - |
| WBS 8 | | 1 | - | - | - | x | x | - |
| WBS 9 | | 1 | - | - | - | x | x | - |
| WBS 10 | | 1 | - | - | - | - | x | - |
| WBS 1 | Bonnet 2 | 0 | - | - | - | - | - | - |
| WBS 2 | | 0 | - | - | - | - | - | - |
| WBS 3 | | 0 | - | - | - | - | - | - |
| WBS 4 | | 0 | - | - | - | - | - | - |
| WBS 5 | | 1 | x | x | x | - | - | - |
| WBS 6 | | 1 | - | x | x | - | - | - |
| WBS 7 | | 1 | - | x | - | - | - | - |
| WBS 8 | | 1 | - | x | - | - | - | - |
| WBS 9 | | 0 | - | - | - | - | - | - |
| WBS 10 | | 0 | - | - | - | - | - | - |
| WBS 1 | Bonnet 3 | 1 | x | - | - | - | - | - |
| WBS 2 | | 1 | - | x | - | - | - | - |
| WBS 3 | | 1 | x | x | x | - | - | - |
| WBS 4 | | 1 | - | x | x | - | - | - |
| WBS 5 | | 1 | x | x | x | - | - | - |
| WBS 6 | | 1 | - | x | x | - | - | - |
| WBS 7 | | 1 | - | x | - | - | - | - |
| WBS 8 | | 1 | - | x | - | - | - | - |
| WBS 9 | | 0 | - | - | - | - | - | - |
| WBS 10 | | 0 | - | - | - | - | - | - |
| WBS 1 | Bonnet 4 | 0 | - | - | - | - | - | - |
| WBS 2 | | 0 | - | - | - | - | - | - |
| WBS 3 | | 0 | - | - | - | - | - | - |
| WBS 4 | | 0 | - | - | - | - | - | - |
| WBS 5 | | 1 | x | x | - | - | - | - |

| BOP Bonnets | Well Bore Size (WBS) | | | | | | | | | |
|---|---|---|---|---|---|---|---|---|---|---|
| Bonnet Type | WBS 1 | WBS 2 | WBS 3 | WBS 4 | WBS 5 | WBS 6 | WBS 7 | WBS 8 | WBS 9 | WBS 10 |
| Bonnet 1 | - | x | x | x | x | x | x | x | x | x |
| Bonnet 2 | - | | | | x | x | x | x | - | - |
| Bonnet 3 | x | x | x | x | x | x | x | x | - | - |
| Bonnet 4 | - | - | - | - | x | - | - | - | - | - |

GUI Generator
1310

Logic Generator
1320

Graphics Generator
1330

Communications Interface
1340

Fig. 13

WELL EQUIPMENT SYSTEM CONFIGURATION FRAMEWORK

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

A reservoir can be a subsurface formation (e.g., a formation reservoir) that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations.

SUMMARY

A computational framework can include a graphical user interface (GUI) generator; a logic generator; and a graphics generator, where the GUI generator generates a GUI for configuring a system of well equipment based on selections of graphical menu items, where the GUI dynamically responds to an interactive selection of one of the graphical menu items based on logic generated by the logic generator, and where the graphics generator generates a vector graphics representation of the system of well equipment as configured. A method can include transmitting instructions to render a graphical user interface (GUI) to a display, where the GUI includes conditionally renderable graphical menus for configuring a system of well equipment; receiving a signal responsive to selection of a menu item of a rendered one of the graphical menus; responsive to receipt of the signal and the selection as a condition, limiting menu items of another one of the graphical menus based on logic of an equipment compatibility data structure; receiving one or more additional signals responsive to selection of one or more additional menu items; and responsive to receipt of the one or more additional signals, generating a vector graphics representation of the system of well equipment as configured. One or more computer-readable storage media can include processor-executable instructions to instruct a computing system to: transmit instructions to render a graphical user interface (GUI) to a display, where the GUI includes conditionally renderable graphical menus for configuring a system of well equipment; receive a signal responsive to selection of a menu item of a rendered one of the graphical menus; responsive to receipt of the signal and the selection as a condition, limit menu items of another one of the graphical menus based on logic of an equipment compatibility data structure; receive one or more additional signals responsive to selection of one or more additional menu items; and responsive to receipt of the one or more additional signals, generate a vector graphics representation of the system of well equipment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 11 illustrates an example of a data structure;

FIG. 12 illustrates an example of a data structure;

FIG. 13 illustrates an example of a framework;

DETAILED DESCRIPTION

This description is not to be taken in a limiting sense, but rather is made merely for the purpose of describing the general principles of the implementations. The scope of the described implementations should be ascertained with reference to the issued claims.

Below, various environments, systems, types of equipment, frameworks, etc., are described with respect to field operations. As explained, various equipment can be provided for blowout protection.

Figure 1:
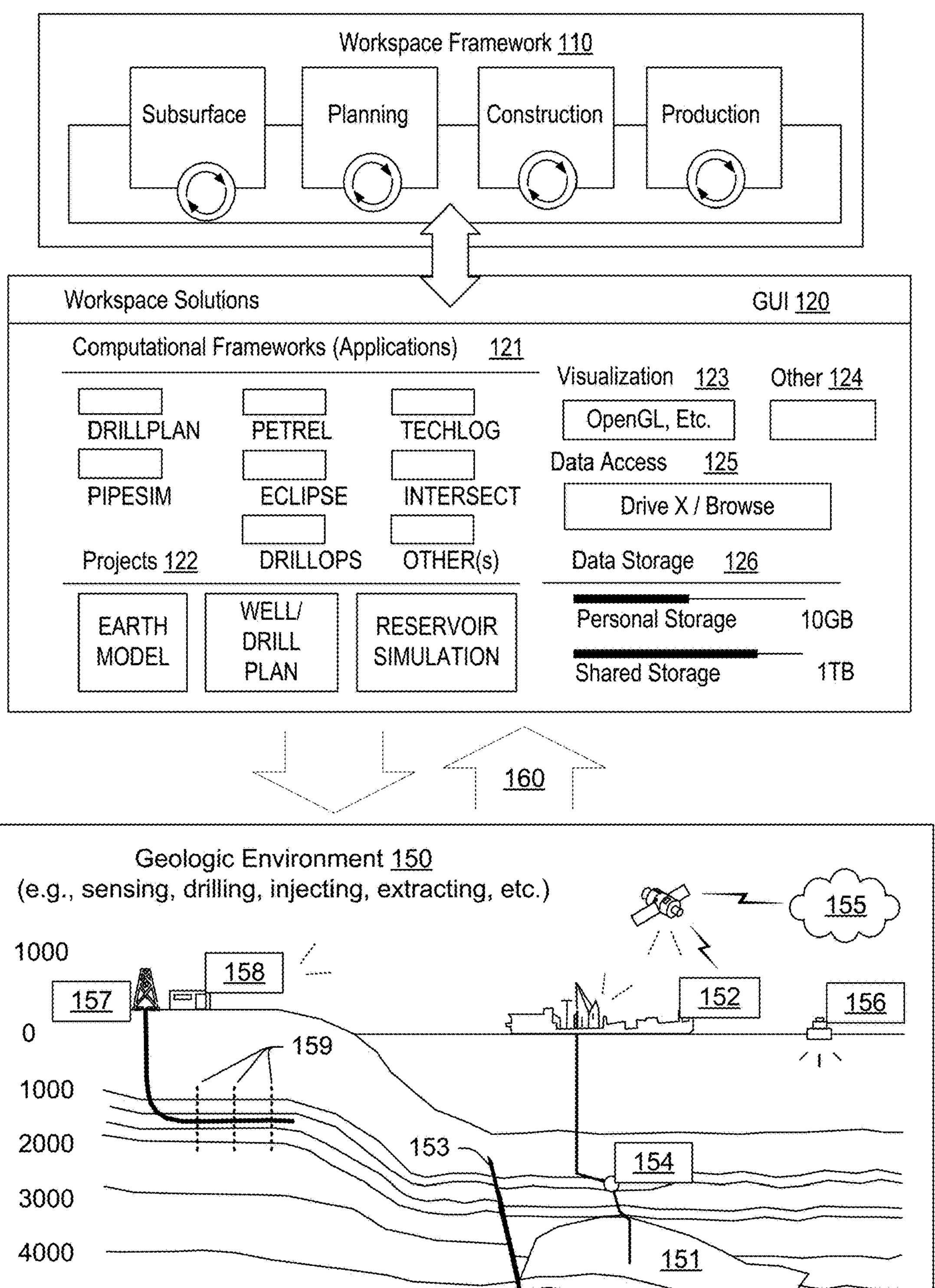
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, predictors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, predicting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, INTERSECT and DRILLOPS frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The DRILLOPS framework may execute a digital drilling plan and ensures plan adherence, while delivering goal-based automation. The DRILLOPS framework may generate activity plans automatically for individual operations, whether they are monitored and/or controlled on the rig or in town. Automation may utilize data analysis and learning systems to assist and optimize tasks, such as, for example, setting ROP to drilling a stand. A preset menu of automatable drilling tasks may be rendered, and, using data analysis and models, a plan may be executed in a manner to achieve a specified goal, where, for example, measurements may be utilized for calibration. The DRILLOPS framework provides flexibility to modify and replan activities dynamically, for example, based on a live appraisal of various factors (e.g., equipment, personnel, and supplies). Well construction activities (e.g., tripping, drilling, cementing, etc.) may be continually monitored and dynamically updated using feedback from operational activities. The DRILLOPS framework may provide for various levels of automation based on planning and/or re-planning (e.g., via the DRILLPLAN framework), feedback, etc.

The PETREL framework can be part of the DELFI cognitive exploration and production (E&P) environment (SLB, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). As an example, such an environment can provide for operations that involve one or more frameworks. The DELFI environment may be referred to as the DELFI framework, which may be a framework of frameworks. As an example, the DELFI environment can include various other frameworks, which can include, for example, one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. In such an approach, one or more features of a framework that may be available in one language may be accessed via a converter. For example, consider the APACHE SPARK framework that can include features available in a particular language where a converter may convert code in another language to that particular language such that one or more of the features can be utilized. As an example, a production field may include various types of equipment, be operable with various frameworks, etc., where one or more languages may be utilized. In such an example, a converter may provide for feature flexibility and/or compatibility.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As an example, a visualization framework such as the OpenGL framework (Khronos Group, Beaverton, Oregon) may be utilized for visualizations. The OpenGL framework provides a cross-language, cross-platform application programming interface for rendering 2D and 3D vector graphics where the application programming interface may be used to interact with a graphics processing unit (or units), to achieve hardware-accelerated rendering.

As an example, one or more types of visualization frameworks may be utilized. As an example, vector graphics may be utilized. As an example, one or more features of the Graphics Language (GL) Transmission Format (glTF) family may be utilized (Khronos Group, Beaverton, Oregon). As an example, the GLB binary file format may be utilized, for example, for representation of 3D models saved in the glTF. Information about 3D models such as node hierarchy, cameras, materials, animations and meshes may be stored in a binary format. As an example, a binary format may store a glTF asset (e.g., JSON, .bin and images) in a binary large object (blob). As an example, GLB may be utilized to help reduce issues of an increase in file size which may occur in various instances with glTF. For example, the GLB file format may result in compact file sizes, fast loading, complete 3D scene representation, and extensibility for further development.

As to the glTF, it is a standard file format for three-dimensional scenes and models. A glTF file may use file extensions such as, for example, .gltf (e.g., JSON/ASCII) or .glb (e.g., binary). Both .gltf and .glb files may reference external binary and texture resources. As an example, such formats may be self-contained by directly embedding binary data buffers (e.g., as base64-encoded strings in .gltf files or as raw byte arrays in .glb files). As an example, a framework may support 3D model geometry, appearance, scene graph hierarchy, and animation. As an example, a framework may help to streamline operations and be an interoperable format for delivery of graphics assets, for example, while minimizing file size and runtime processing by one or more applications. As an example, an application may be built using the WebGL application programming interface (API) (Khronos Group, Beaverton, Oregon). As an example, the WebGL API may utilize HTML5 canvas elements. As an example, WebGL may be browser implemented.

As an example, Scalable Vector Graphics (SVG) may be utilized, which may be in the form of an XML-based vector image format that may define graphics, which may have support for interactivity and animation. As an example, SVG images may be defined in a vector graphics format and stored in XML text files. SVG images may be scaled in size without loss of quality, and SVG files may be searched, indexed, scripted, and/or compressed. As an example, an XML text file may be created and/or edited (e.g., using text editors and/or vector graphics editors). As an example, an XML file may include information that can drive rendering of graphics to a display (e.g., consider web browser type of rendering, etc.).

While several simulators are illustrated in the example of FIG. 1, one or more other simulators may be utilized, additionally or alternatively. For example, consider the VISAGE geomechanics simulator (SLB, Houston Texas) or the PETROMOD simulator (SLB, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (SLB, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well).

Figure 2:
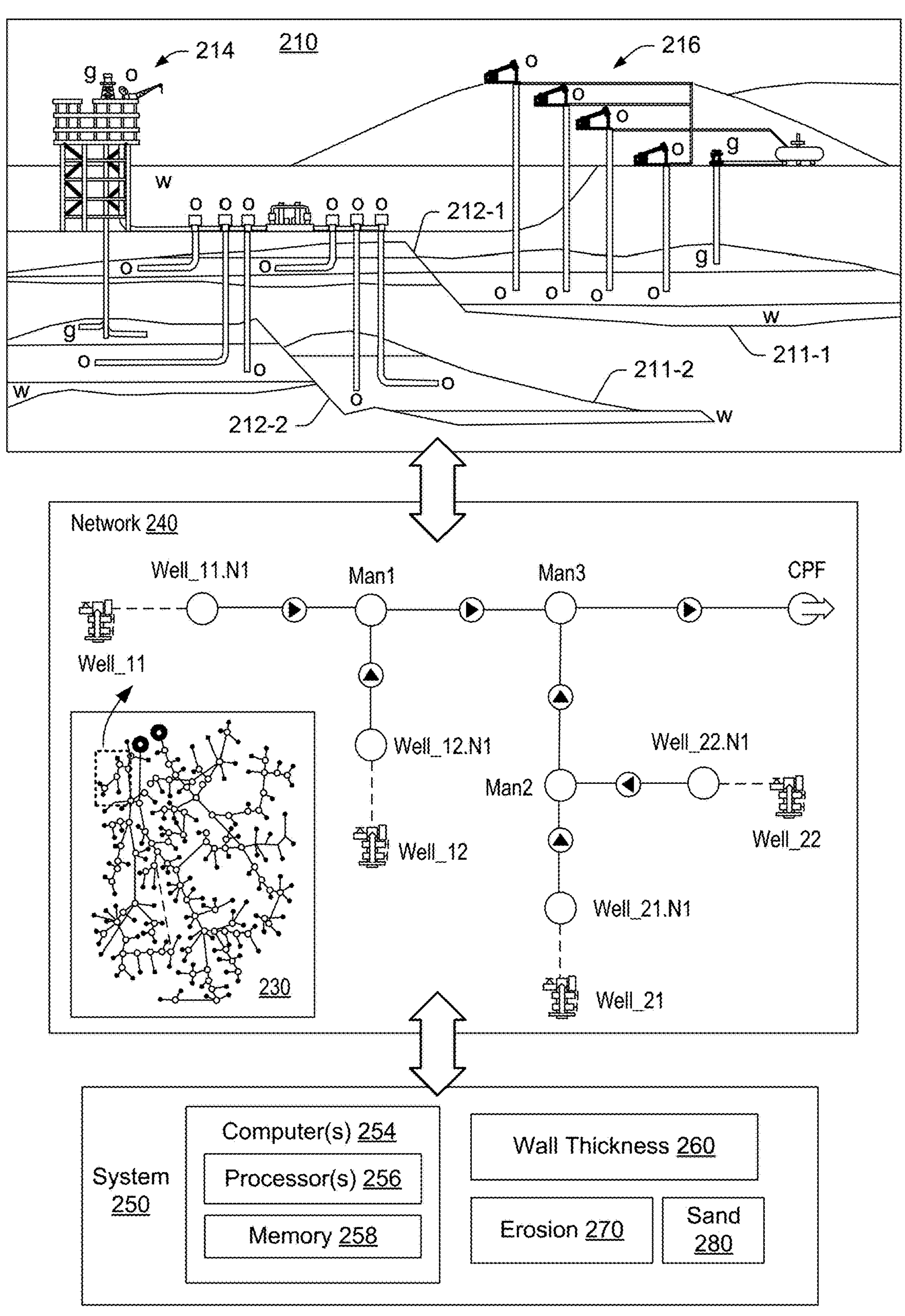
FIG. 2 illustrates examples of equipment, an example of a network and an example of a system.

FIG. 2 shows an example of a geologic environment 210 that includes reservoirs 211-1 and 211-2, which may be faulted by faults 212-1 and 212-2, an example of a network of equipment 230, an enlarged view of a portion of the network of equipment 230, referred to as network 240, and an example of a system 250. FIG. 2 shows some examples of offshore equipment 214 for oil and gas operations related to the reservoir 211-2 and onshore equipment 216 for oil and gas operations related to the reservoir 211-1. In the example of FIG. 2, the geologic environment 210 can include fluids such as oil (o), water (w) and gas (g), which may be stratified in the reservoirs 211-1 and 211-2.

In the example of FIG. 2, the equipment 214 and 216 can include one or more of drilling equipment, wireline equipment, production equipment, etc. For example, consider the equipment 214 as including a drilling rig that can drill into a formation to reach a reservoir target where a well can be completed for production of hydrocarbons. As an example, the equipment 216 can include production equipment such as wellheads, valves, pump equipment, gas handling equipment, etc. As an example, one or more features of the system 100 of FIG. 1 may be utilized for operations in the geologic environment 210. For example, consider utilizing a drilling or well plan framework, a drilling execution framework, a production framework, etc., to plan, execute, etc., one or more drilling operations, production operations, etc.

In FIG. 2, the network 240 can be an example of a relatively small production system network. As shown, the network 240 forms somewhat of a tree like structure where flowlines represent branches (e.g., segments) and junctions represent nodes. As shown in FIG. 2, the network 240 provides for transportation of fluid (e.g., oil, water and/or gas) from well locations (e.g., Well_11, Well_12, Well_21, and Well_22) along flowlines interconnected at junctions with final delivery at a central processing facility (CPF). Where fluid includes solids (e.g., sand, etc.), one or more pieces of equipment may provide for solids removal, collection, etc.

In the example of FIG. 2, various portions of the network 240 may include conduit. For example, consider a perspective view of a geologic environment that includes two conduits which may be a conduit to Man1 and a conduit to Man3 in the network 240, where Man1, Man2 and Man3 are manifolds. In the example of FIG. 2, various portions of the network of equipment 230 can include one or more pumps, which can include one or more surface and/or subsurface pumps.

As shown in FIG. 2, the example system 250 includes one or more computers 254 and one or more sets of instructions 260, 270 and 280. As to the one or more computers 254, each computer may include one or more processors (e.g., or processing cores) 256 and memory 258 for storing instructions (e.g., one or more of the sets of instructions 260, 270 and 280), for example, executable by at least one of the one or more processors 256. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more storage devices. As an example, information that may be stored in the one or more storage devices may include information about equipment, location of equipment, orientation of equipment, fluid characteristics, etc.

As an example, the instructions 260 can include instructions (e.g., stored in the memory 258) executable by at least one of the one or more processors 256 to instruct the system 250 to perform various actions related to wall thickness of one or more pieces of equipment (e.g., conduits, etc.), where wall thickness may change as a result of sand being present in hydrocarbon fluid.

As an example, the instructions 270 can include instructions (e.g., stored in the memory 258) executable by at least one of the one or more processors 256 to instruct the system 250 to perform various actions related to erosion of one or more pieces of equipment (e.g., conduits, etc.), where erosion may occur as a result of sand being present in hydrocarbon fluid.

As an example, the instructions 280 can include instructions (e.g., stored in the memory 258) executable by at least one of the one or more processors 256 to instruct the system 250 to perform various actions related to sand, which, as explained, can be liberated by a formation via one or more mechanisms (e.g., entrainment of existing sand, dissolution of formation rock, fracturing of formation rock, etc.).

As an example, the system 250 may be configured to provide for establishing one or more frameworks, for example, consider a framework that can provide for sand monitoring and/or control, a framework that can perform network modeling (see, e.g., the PIPESIM framework of the example of FIG. 1, etc.) and/or other modeling. As an example, one or more methods, techniques, etc. may be performed using one or more sets of instructions.

As an example, various graphics in FIG. 2 may be part of a graphical user interface (GUI) that can be generated using executable instructions that may be executable locally and/or remotely using local and/or remote display devices (e.g., a mobile device, a workstation, etc.).

Figure 3:
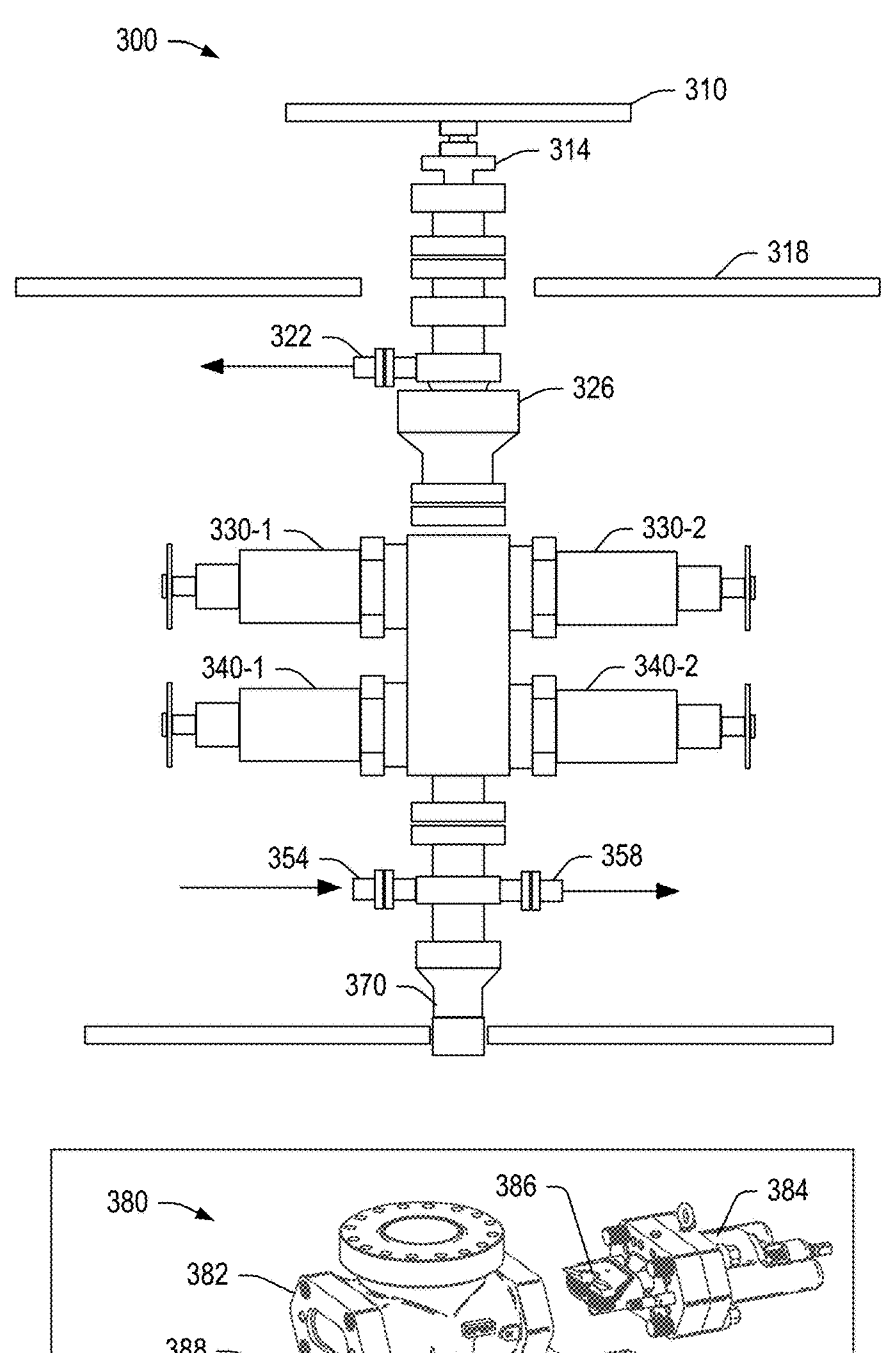
FIG. 3 illustrates examples of equipment.

FIG. 3 shows an example of a blowout preventer (BOP) 300 and a perspective view of an example of an assembly of components 380. As shown, the BOP 300 can include an injector head 310, a stripper 314 that may be disposed at an axial position above a rig floor 318 where, for example, below the rig floor 318, the BOP 300 can include one or more mud returns 322, an annular preventer 326, blind rams 330-1 and 330-2, shear rams 340-1 and 340-2, a kill line fitting 354, a choke line fitting 358 and a wellhead, casing or Christmas tree 370 that may be at a ground level. The BOP 300 can be defined as a BOP stack, which is generally a stack of components that form an assembly for blowout prevention.

As shown in FIG. 3, the assembly of components 380 can include a body 382, a bonnet 384 and a ram assembly 386. As shown, the body 382 can include various flanges, for example, flanges for mounting the body 382 to another body and flanges for bonnet mounting. In the example of FIG. 3, the assembly of components 380 shows the body 382 as being mounted to another body with bonnets and ram assemblies 388. In the example of FIG. 3, the assembly of components 380 may include features of a U BOP (SLB, Houston, Texas), an UM BOP (SLB, Houston, Texas), and/or one or more other BOPs.

As an example, a BOP stack may be a set of two or more BOPs used to ensure pressure control of a well. For example, a stack might include one to six ram-type preventers and, optionally, one or two annular-type preventers. As an example, a stack configuration may include ram preventers on the bottom and annular preventers at the top.

A configuration of a stack of preventers may be optimized to provide desired pressure integrity, safety and flexibility in the event of a well control incident. For example, in a multiple ram configuration, one set of rams might be fitted to close on 5-in diameter drillpipe, another set configured for 4½-in drillpipe, a third fitted with blind rams to close on the openhole, and a fourth fitted with a shear ram that can cut and hang-off the drillpipe as a last resort.

In various examples, an annular preventer or two may be provided on the top of a stack as annular preventers can be closed over a wide range of tubular sizes and an openhole, but they may not be rated for pressures as high as ram preventers. As an example, a BOP stack can include various spools, adapters and piping outlets to permit circulation of wellbore fluid under pressure in the event of a well control incident.

As an example, a BOP can include a relatively large valve at a top of a well that may be closed if a drilling crew loses control of formation fluids. By closing this valve, which may be operated remotely via one or more hydraulic actuators, the drilling crew may regain control of a reservoir where, for example, one or more procedures may be initiated to increase mud density until it is possible to open the BOP and retain pressure control of the formation.

BOPs can be configured in a variety of styles, sizes, and pressure ratings. As an example, a BOP may effectively close over an open wellbore. As an example, a BOP may be designed to seal around one or more tubular components in a well (e.g., drillpipe, casing, or tubing). As an example, a BOP may be fitted with hardened steel shearing surfaces that can actually cut through drillpipe.

As a BOP is important to safety of a crew, a rig, and a wellbore itself, BOPs are inspected, tested, and refurbished at regular intervals determined by a combination of risk assessment, local practice, well type, and legal requirements. BOP tests may vary, for example, from daily function testing on critical wells to monthly or less frequent testing on wells thought to have low probability of well control problems.

As an example, a blind ram can be a thick, heavy steel component of a ram BOP. In a normal pipe ram, two blocks of steel that meet in the center of a wellbore to seal the well can have a hole (e.g., one-half of the hole on each piece) through which the pipe fits. A blind ram has no space for pipe and is instead blanked off to be able to close over a well that does not contain a drillstring. It may be loosely thought of as the sliding gate on a gate valve.

As an example, a shear ram can be a BOP closing element fitted with hardened tool steel blades designed to cut drillpipe or tubing when the BOP is closed, and then fully close to provide isolation or sealing of a wellbore. A shear ram may be used as a last resort to regain pressure control of a well that is flowing. Once drillpipe is cut (or sheared) by the shear rams, it is usually left hanging in the BOP stack, and kill operations become more difficult. A joint of drillpipe or tubing is destroyed in the process, but the rest of the string is unharmed by the operation of shear rams.

As an example, an annular preventer can be or include a relatively large valve that can be used to control wellbore fluids. In this type of valve, the sealing element resembles an elastic doughnut that can be mechanically squeezed inward to seal on either pipe (e.g., drill collar, drillpipe, casing, or tubing) or an openhole.

As explained, a BOP or BOP stack can be a conditional surface pressure barrier that can be configured in a desired manner, for example, to include one or more sets of hydraulically operated rams that include components designed to grip pipe, seal around pipe, shear off pipe or seal an openhole during drilling or a workover. As explained, a BOP or BOP stack may include an annular preventer.

The American Petroleum Institute (API) provides various definitions and guidance for BOPs. For example, consider the API Recommended Practices (RP) 53 Blowout Prevention Equipment Systems For Drilling Wells specification (e.g., 3rd Edition, March 1997). According to the API, the purpose of these recommended practices is to provide information that can serve as a guide for installation and testing of blowout prevention equipment systems on land and marine drilling rigs (barge, platform, bottom-supported, and floating). Blowout prevention equipment systems are composed of systems required to operate the blowout preventers (BOPS) under varying rig and well conditions. According to API, these systems are: blowout preventers (BOPs), choke and kill lines, choke manifold, hydraulic control system, marine riser, and auxiliary equipment. The primary functions of these systems are to confine well fluids to the wellbore, provide means to add fluid to the wellbore, and allow controlled volumes to be withdrawn from the wellbore. In API RP 53, diverter systems are also addressed, though their primary purpose is to safely divert flow rather than to confine fluids to the wellbore.

Figure 4:
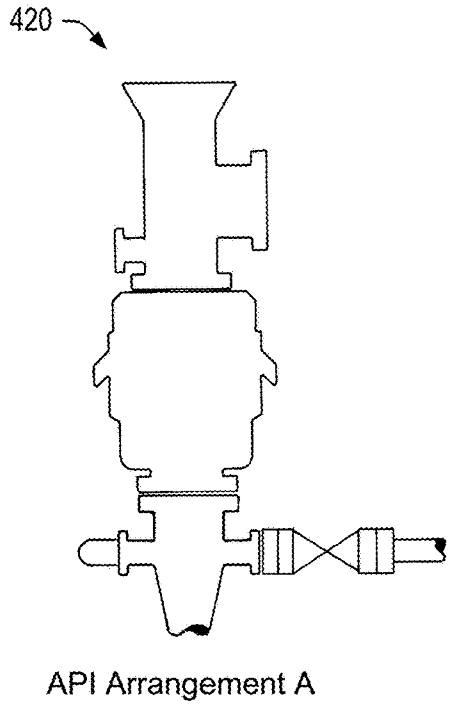
FIG. 4 illustrates examples of equipment.
Figure 4:
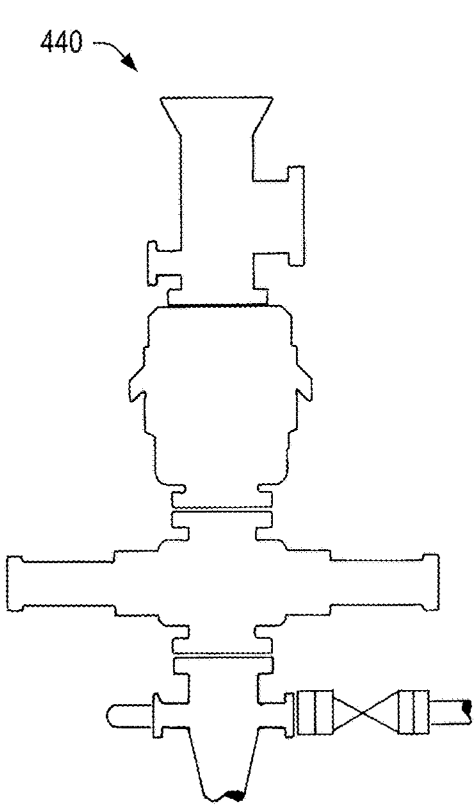
Figure 4:
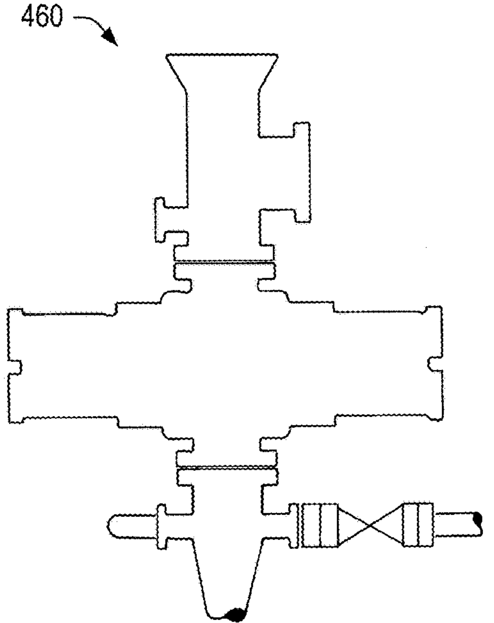

FIG. 4 shows some examples of BOPs 420, 440 and 460, which correspond to API Class II types of blowout prevention equipment (BOPE). In particular, the BOP 420 is a Class II annular-type preventer ("A"), the BOP 440 is a Class II with single ram-type preventer with one set of rams (e.g., either blank or for pipe) and with an annular-type preventer, and the BOP 460 is a Class II with two ram-type preventers or a double ram-type preventer with two sets of rams, positioned in accord with an operator's choice. According to the API, the letter "S" can be utilized to indicate a drilling spool with side outlet connections, for example, for one or more of choke and kill lines.

As an example, a kill line can be a relatively high-pressure pipe leading from an outlet on a BOP stack to high-pressure rig pumps (e.g., drilling fluid pumps). During normal well control operations, kill fluid can be pumped through a drillstring and annular fluid taken out of the well through a choke line to a choke, which can be utilized to reduce fluid pressure (e.g., drop fluid pressure to atmospheric pressure). If a drillpipe is inaccessible, it may be necessary to pump heavy drilling fluid in the top of the well, wait for the fluid to fall under the force of gravity, and then remove fluid from the annulus. In such an operation, while one high pressure line may suffice, it can be more convenient to have two lines. In addition, such an approach provides a measure of redundancy for operation. In floating offshore operations, choke and kill lines may exit a subsea BOP stack and run along outside of a riser to the surface. The volumetric and frictional effects of these long choke and kill lines can be taken into account for well control.

As an example, a BOP can utilize one or more types of mechanisms to drive a ram, a valve, etc. For example, consider one or more of manual, hydraulic and electrical. As an example, an electric BOP control system can utilize a servo that includes a servo motor and drive, which may be interfaced for remote monitoring and/or operation. As an example, one or more torque control algorithms may be tuned for optimal operation based on system demand, which may increase availability and utilization, which may further result in efficient operation. As an example, a hybrid BOP system can include a battery interface where, for example, an advanced battery management system may be connected to a controller. In such an example, one or more types of secured protocols may be implemented. As an example, connectivity may be elevated to one or more remote interface systems that can provide a platform for advanced battery module management, for example, to maximize availability.

Industry standards (e.g., API) for various BOPs can specify that ram BOPs and annular BOPs are to close within a certain number of seconds (e.g., 45 seconds for ram and 60 seconds for annular); noting that operators may aim to close as fast as is practical. Various BOP control systems are hydraulic where directional control valves in control pods on a BOP stack may be controlled via hydraulic pulses (e.g., pressure up and/or bleed off) through pilot hoses. So-called hybrid electro-hydraulic (EH) control systems may utilize, for example, a pump/accumulator unit, a universal or uninterruptible power supply (UPS), electrical wiring, etc. As an example, a system may utilize electrical lines coupled to solenoid pod functions (e.g., rams, annulars and possibly connector release), which can provide for timely operation, noting that hydraulic pilot lines may also be utilized (e.g., for non-critical time dependent functions). As an example, an assembly that may include one or more solenoids and hydraulic/electrical connectors may be packaged to fit with an existing all-hydraulic control pod.

As an example, a BOP system can include various electrical devices that can operate using electrical power, which may be from a grid and/or one or more other power sources, which may include batteries. As an example, an electric ram may be rated by a maximum electrical power consumption for one or more functions, which may be an instantaneous maximum load. For example, consider a load of 5 kW to 100 kW or more that can be utilized to drive a ram in a desired amount of time (e.g., from 5 seconds to 100 seconds). As an example, one or more actuators may be idle and ready to receive electrical power to deliver a desired amount of torque. As an example, one or more types of preventers may be utilized as backups and/or for accidents.

As explained, an electric system can utilize live electrical power and/or battery electrical power. As an example, a site may include one or more types of power management system, which can provide for selecting one or more sources of energy for one or more purposes. As an example, a site may include a battery system, which includes banks of batteries, which may include, for example, lithium-based batteries (e.g., lithium-ion, lithium metal, etc.).

As an example, a BOP or BOP stack may be configured in an integrative manner with respect to power. For example, consider use of hydraulic, hydraulic-electric and/or electric preventers and/or diverters as part of a BOP system where appropriate power is to be available for implementation in the field. As more options become available for BOP systems, the complexity and logistics of BOP system design can increase, while still aiming to comply with one or more of various standards (e.g., API, etc.). For example, if a risk exists as to availability of electrical power, then battery backup may be required and/or use of hydraulics. In such an example, if battery backup is present, then one or more systems may be demanded for monitoring and appropriately managing the battery backup. For example, lithium-ion batteries may be cycled, temperature controlled, etc., such that a bank of batteries has increased longevity and persistent availability of charge sufficient for one or more BOP system operations.

As explained, BOP systems (e.g., BOP stacks, etc.) can include various types of equipment, which may include features that are hydraulic, electric, hybrid, etc. Such systems can include well control interfaces for drive systems and control mechanisms. As an example, a computation framework can generate one or more user interfaces (UIs) for well orchestration where, for example, each component design used in a UI can include features associated with equipment monitoring, operating, troubleshooting, etc.

As an example, a framework can provide for system design using one or more UI, which can be or can include one or more graphical user interfaces (GUIs). For example, consider an overview GUI, an analog monitoring GUI (e.g., including system gauges) for a hybrid system and a servo system GUI for an electric control system. As an example, core design elements that can contribute to system design can include one or more web components such as, for example, dynamic vector graphics (e.g., SVG, etc.), equipment live chart with a trending tool, 3D rendered solid cut away animations and web control-based system gauges, which may be specifically designed for representing analog change over.

As an example, a design proposal can be generated that interrelates system operation performance metrics, performance monitoring, and system alerts as primary scheme for enabling enhanced operation performance that can increases reliability. As an example, a framework can interrelate concepts to form the basis of a human machine interface (HMI) operating and monitoring system. As an example, system design can provide for GUI generation (e.g., HMI generation) that enables visibility for monitoring condition of various pieces of equipment, understanding trends in usage or behavior, and understanding impacts of changes that an operator and/or a controller may make to a system.

As an example, a framework can improve HMIs for various equipment systems. For example, a framework can go beyond capabilities of an HMI generation approach for oil & gas application that is designed for the purpose of accessing control systems by and operator, as developed using text and indication-based depictions for status and alarms with conventional static graphics. For example, rather than static graphics, text and indication-based design, which may annoy an operator and increase risk of diversion from a GUI (e.g., user distraction), a framework can provide for enhanced, dynamic interactivity that helps to assure operator engagement. Such an approach may be implemented using lesser screen space (e.g., fewer changes from GUI to GUI, etc.) to make interactions more intuitive and streamlined. As an example, a framework can provide for enhanced responsiveness and intelligence that links operator desires with equipment availabilities and capabilities. Such a framework can generate one or more UIs that decrease demand for graphical controls, number of interactions (e.g., clicks), and overall time, whether to build a system that an operator has in mind or to explore multiple different systems that may meet performance goals or provide for optimal performance.

As an example, a framework can generate a web-based HMI application for accessing a control system that involves a single point of access (SPA) design concept, which can make the application more reliable, lightweight, memory efficient, and fast in processing with remote accessing ability.

As explained, with respect to BOP systems, a framework can include features for one or more types of BOP equipment, which can include, for example, an electro-hydraulic hybrid BOP control system, a complete electric BOP control system, etc.

Figure 5:
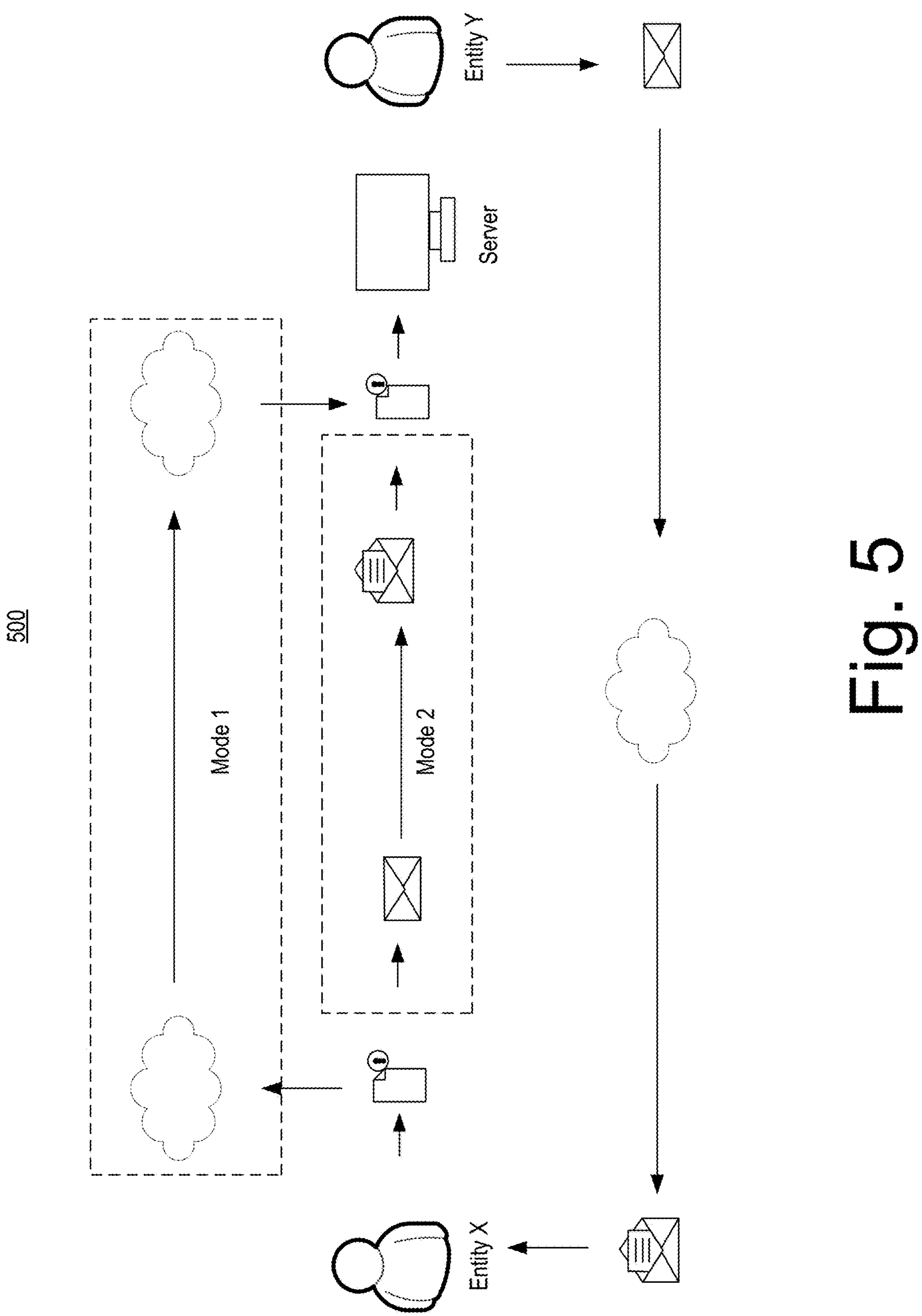
FIG. 5 illustrates an example of a framework.

FIG. 5 shows an example of an architecture 500 for operational modes of a framework. As shown, the architecture 500 can include two or more modes of operation. A first mode, mode 1, can be based on receipt of a digital message, which may be a digital file that specifies particular equipment; whereas, a second mode, mode 2, can be based on engineering of a system of equipment. As an example, a digital message may be an encrypted file developed based on a workflow for configuration of a BOP stack (e.g., corresponding to progression through a series of GUI interactions, etc.).

As to mode 1, a system configuration designed based on a digital transmission configured through an automated configurator enables a BOP object by utilizing display coordinate geometry. In such an example, a system configuration stack-up gets segregated based on a pre-defined back-end program sequence that can populate a 3D model. In such a mode of operation, an object design library can store pre-defined rendered models based on equipment types (e.g., BOP type, bonnet type, ram type, etc.) where an auto configuration tool utilizes display resolution and stack configuration to load an entire BOP object element that can be reassembled as a solid 3D stack in an overview screen. For example, by utilizing a structured visibility approach, different stack elements can be populated based on configuration changes, which dynamically allow an operator to visualize a BOP stack, for example, based on a drill plan.

As shown in FIG. 5, the operational modes can be utilized by various entities, which may be an entity X and an entity Y. In such an example, the entity X may be a supplier and the entity Y may be a client of the supplier. In various examples, an entity or entities can utilize a computational framework that may provide for generation of one or more GUIs and/or other information, which may be utilized for one or more purposes. As an example, a computational framework may provide for generation of one or more GUIs for building an assembly of equipment, for configuring a control system for an assembly of equipment, for controlling an assembly of equipment, etc. As an example, a computational framework may be accessible via one or more network connections, which may include one or more server connections (e.g., consider a back-end server and a front-end device that includes a display for rendering of one or more GUIs).

Figure 6:
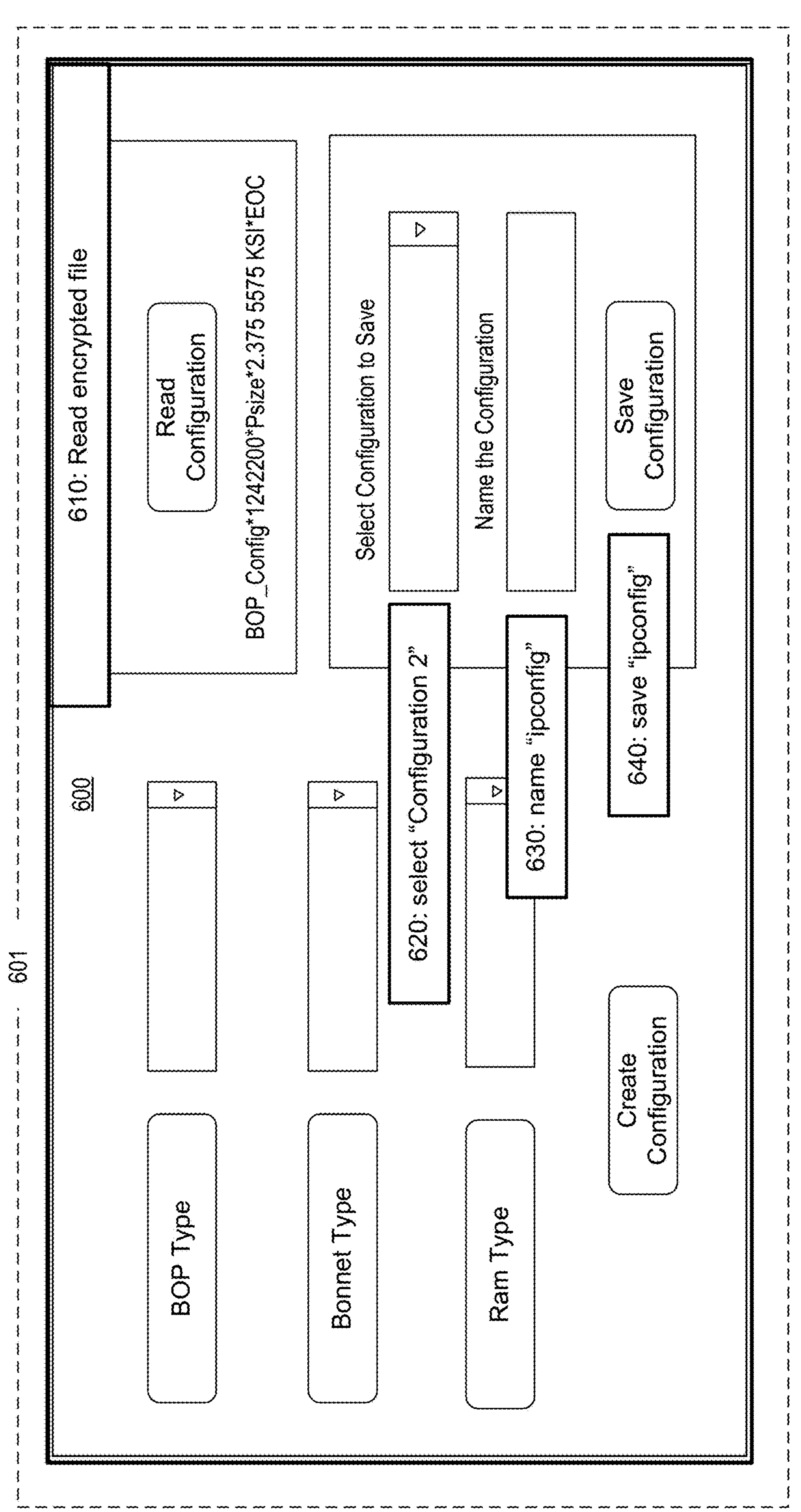
FIG. 6 illustrates an example of a graphical user interface.

FIG. 6 shows an example GUI 600 that can be rendered to a display given execution of framework instructions for the aforementioned mode 1 of operation where a dashed box represents a display screen or portion thereof 601 (e.g., where the GUI 600 is rendered to the display screen or portion thereof 601). As explained, a digital transmission can be received or otherwise uploaded for processing by a framework. The example of FIG. 6 shows a workflow via various workflow blocks 610, 620, 630 and 640. In such an approach, consider the block 610 where an encrypted digital file that is generated and received where the encrypted digital file can be decrypted and read. As shown in the GUI 600, a field can provide for acknowledgement of such a process via rendering of information (e.g., a notification, etc.) where the GUI 600 can also include fields for a system of equipment, which can include, for example, one or more of BOP type, bonnet type, and ram type.

As shown in the example of FIG. 6, the GUI 600 may include various options for handling configurations, which may be part of a workflow. For example, consider reading a configuration from a digital transmission per the block 610, selecting a configuration to save per the block 620, naming the configuration per the block 630 and/or saving a configuration to a digital data storage device per the block 640.

As an example, the GUI 600 may be utilized in a workflow where, after reading a configuration from a digital transmission per the block 610, a configuration can be selected and named per the blocks 620 and 630. Such a configuration may then be saved as a recipe element per the block 640 that can be in a particular format for handling by a framework, for example, to build one or more models (e.g., 3D models, etc.) and/or to populate one or more menu options, graphical controls, graphics, etc.

Figure 7:
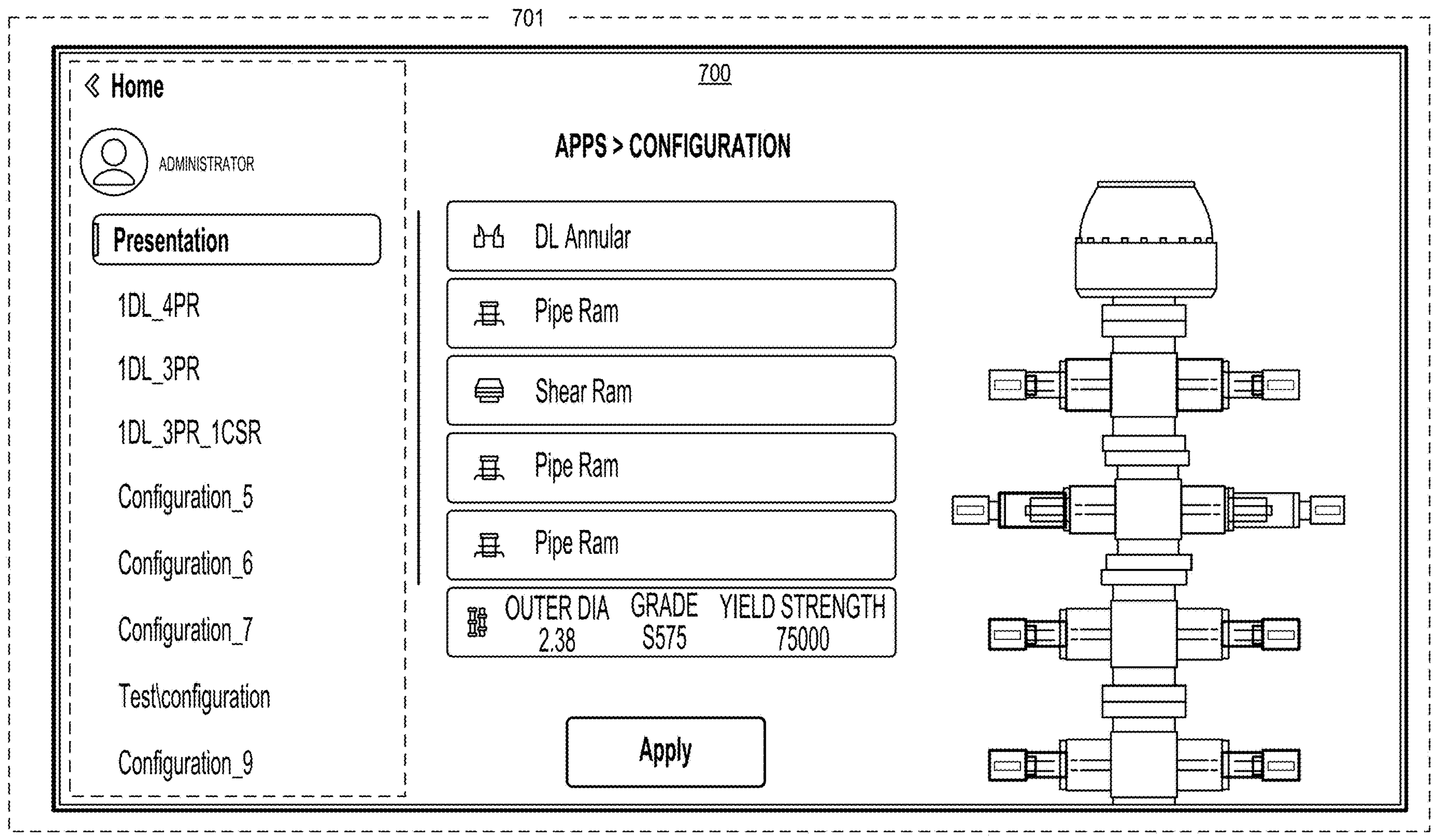
FIG. 7 illustrates an example of a graphical user interface.

FIG. 7 shows an example GUI 700 that can be generated by a framework where a field provides a listing of one or more saved configurations where a dashed box represents a display screen or portion thereof 701. In such an example, one of the configurations can be selected (e.g., "Presentation") and, in response, another field can render graphics and graphical controls for the configuration. As shown, the graphics can include a rendering of a system of equipment according to the selected configuration. As explained, vector graphics may be utilized that can rapidly build a vector-based graphical rendering, which may be in two or more dimensions (e.g., 2D and/or 3D). In the example of FIG. 7, the GUI 700 shows a 2D rendering of a system of equipment as built according to the data in the selected configuration file.

In the example of FIG. 7, the GUI 700 includes graphical controls for a DL annular, a pipe ram, a shear ram, a pipe ram and a pipe ram; noting that the rendered 2D vector graphics of the system of equipment includes 2D renderings of that equipment (e.g., an annular preventer at the top, followed by a pipe ram, a shear ram, a pipe ram, and another pipe ram). Such an approach allows a user to visualize a BOP stack per data in the configuration file. For example, a framework can transform data in a configuration file to a graphical representation of the equipment, a stacked, assembled, etc., for use in the field.

In the example of FIG. 7, the GUI 700 also includes fields for outer diameter, grade and yield strength. As explained, a BOP system can be utilized for well control where, for example, dimensions, classifications, performance ratings, etc., may be desired and/or mandated (e.g., according to API, etc.).

In the example of FIG. 7, the GUI 700 includes an apply graphical control, which may, for example, cause generation of a multidimensional model of a system of equipment after selection of one of the configurations. As explained, a configuration can be a recipe, which can be a recipe consumable by one or more components of a framework for building various elements that can be rendered to a display. As an example, the "apply" graphical control (e.g., button) may be utilized to initiate building of one or more models, which may be, for example, vector graphics models. As explained, a model may be a 3D model, that can be rendered and explored (e.g., in cross-section, in perspective views, etc.) such that a user can determine that the 3D model complies with a user's desired design for implementation in the field.

Figure 8:
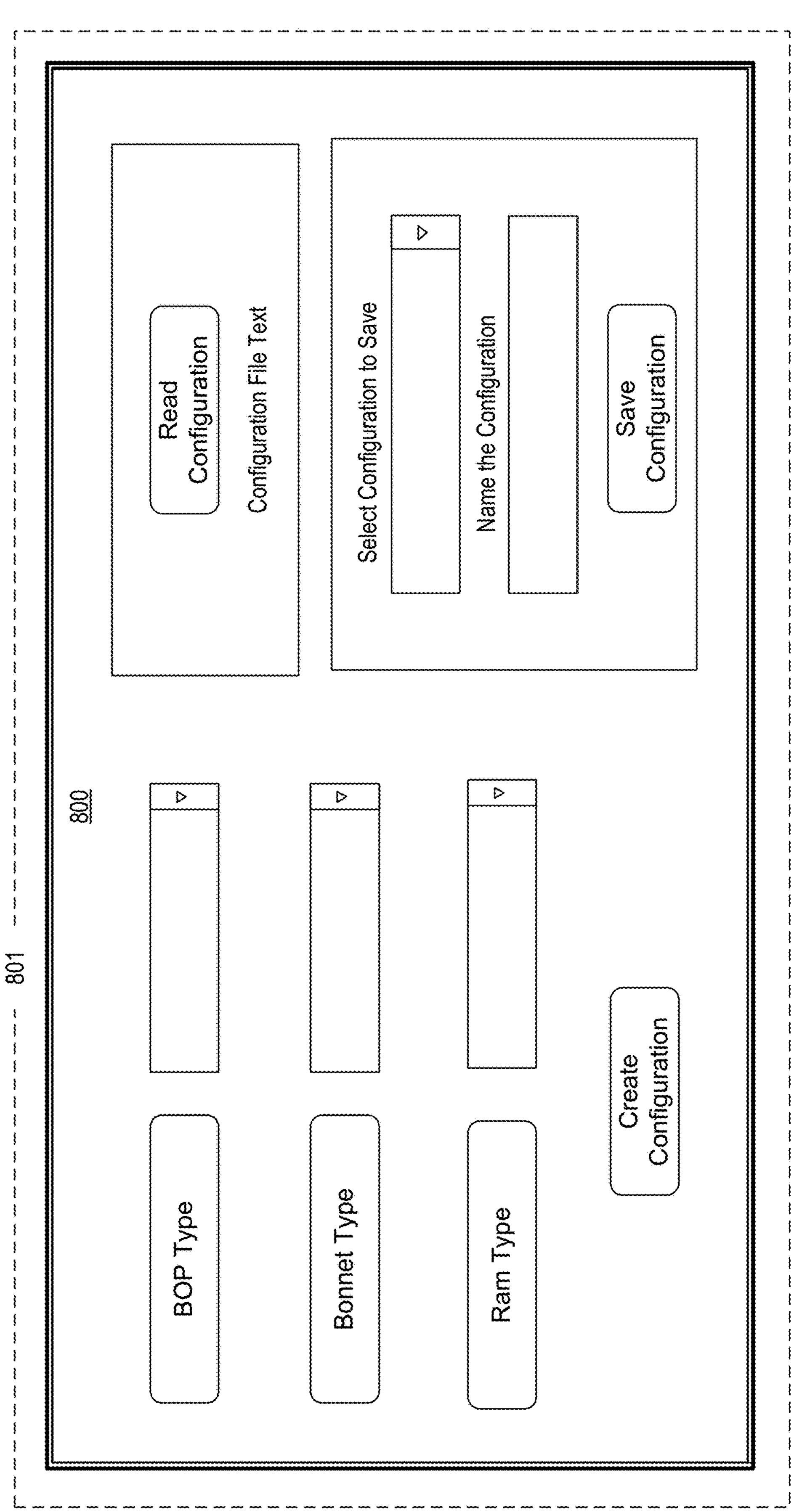
FIG. 8 illustrates an example of a graphical user interface.

FIG. 8 shows an example GUI 800 that can include various features of the GUI 600 of FIG. 6 where a dashed box represents a display screen or portion thereof 801. As an example, the GUI 800 may be utilized in mode 2 of operation of the framework, which may be referred to as an engineering mode of operation. In the example of FIG. 8, the GUI 800 can include a graphical control for configuration creation (see, e.g., a button labeled "Create Configuration"). In such an approach, a workflow may be commenced that utilizes the various features for pieces of equipment such as, for example, the BOP type graphical control, the bonnet type graphical control and/or the ram type graphical control.

Figure 9:
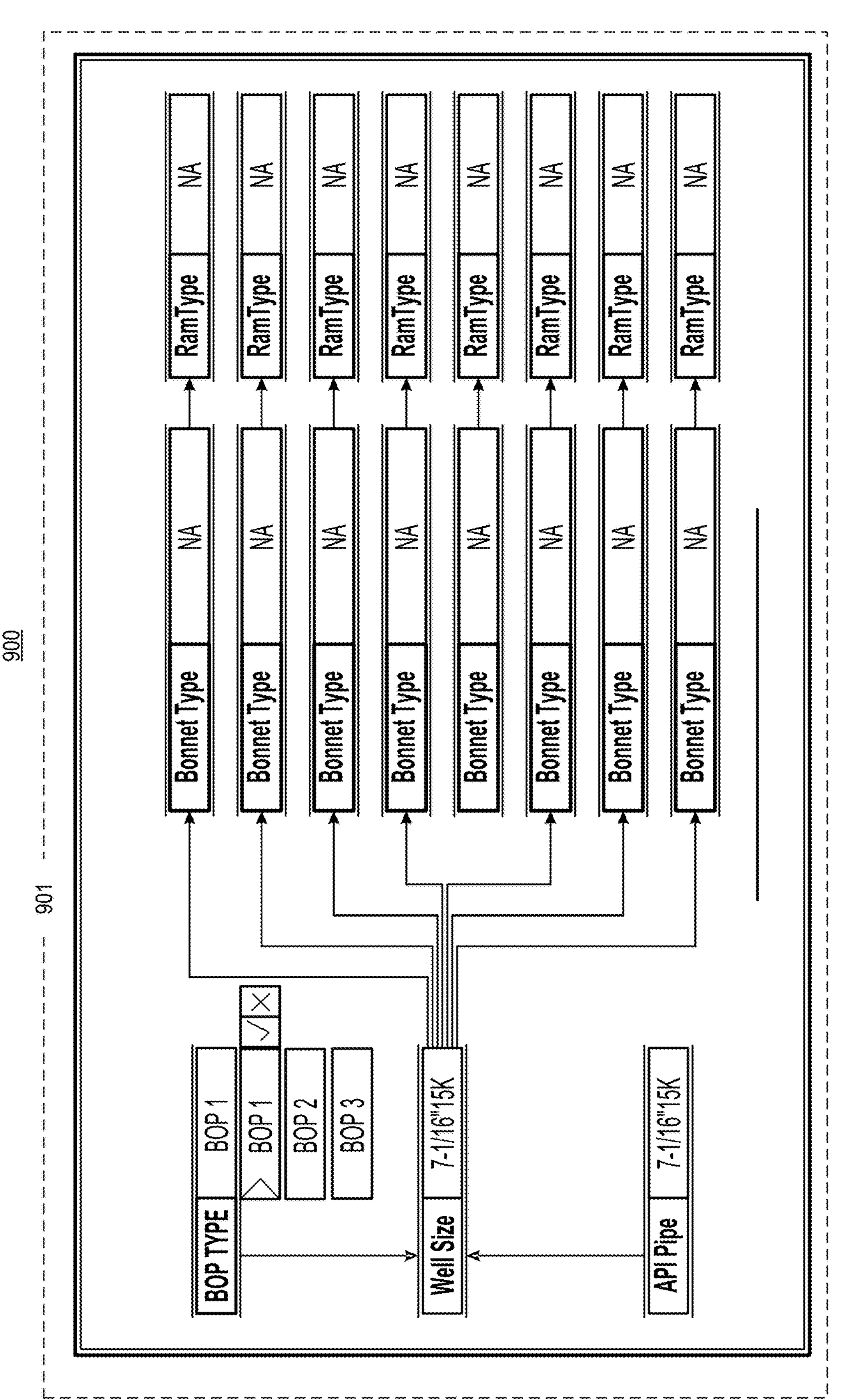
FIG. 9 illustrates an example of a graphical user interface.

FIG. 9 shows an example GUI 900 that can be generated by a framework as part of a workflow that follows from the GUI 800, for example, where the graphical control for configuration creation (e.g., generation) is actuated and where a dashed box represents a display screen or portion thereof 901.

As an example, a workflow may be implemented in a relatively dynamic and streamlined manner where, for example, responsive to receipt of input from a GUI interaction, a GUI may automatically adjust to expedite a subsequence task of the workflow. In such an example, logic may be implemented based on the input where a framework issues instructions for GUI rendering of one or more features based on the logic. In such an approach, a workflow may be expedited through use of logic that provides output responsive to input, for example, where such output may be limited to one or more types of equipment that may be compatible with an assembly of equipment that is being designed and rendered graphically to a display.

As shown, the GUI 900 can include fields for one or more of the various pieces of equipment, which may include graphical controls. For example, as to BOP type, consider a dropdown menu that can be populated using a database of equipment (e.g., optionally controlled by logic, etc.), which may be, for example, particular to a type of field, a geographical region, a particular supplier or suppliers, a particular standard, etc. In the example of FIG. 9, the GUI 900 includes a well size graphical control that can be actuated to cause rendering of various bonnet types that can correspond to a selected well size. For example, the well size graphical control can include a dropdown menu for a listing of available well sizes where, for example, upon selection of a particular well size, the framework can provide for generation of graphical controls for bonnet types and optionally ram types associated with one or more of the bonnet types.

As shown in the example of FIG. 9, the GUI 900 can include an API pipe graphical control, which may be utilized in association with the well size graphical control. For example, the API pipe graphical control may be a selectable graphical control for API pipe or pipe according to one or more other standards. In such an example, where API pipe is selected, the well size graphical control may be populated with well sizes that correspond to standard API pipe sizes. In such an approach, a BOP system can be configured that comports with one or more API standards.

In the example of FIG. 9, a selection of a type of BOP such as, for example, BOP 1, may be made from a list (e.g., a menu) where, for example, the GUI 900 may automatically update in response to the selection.

Figure 10:
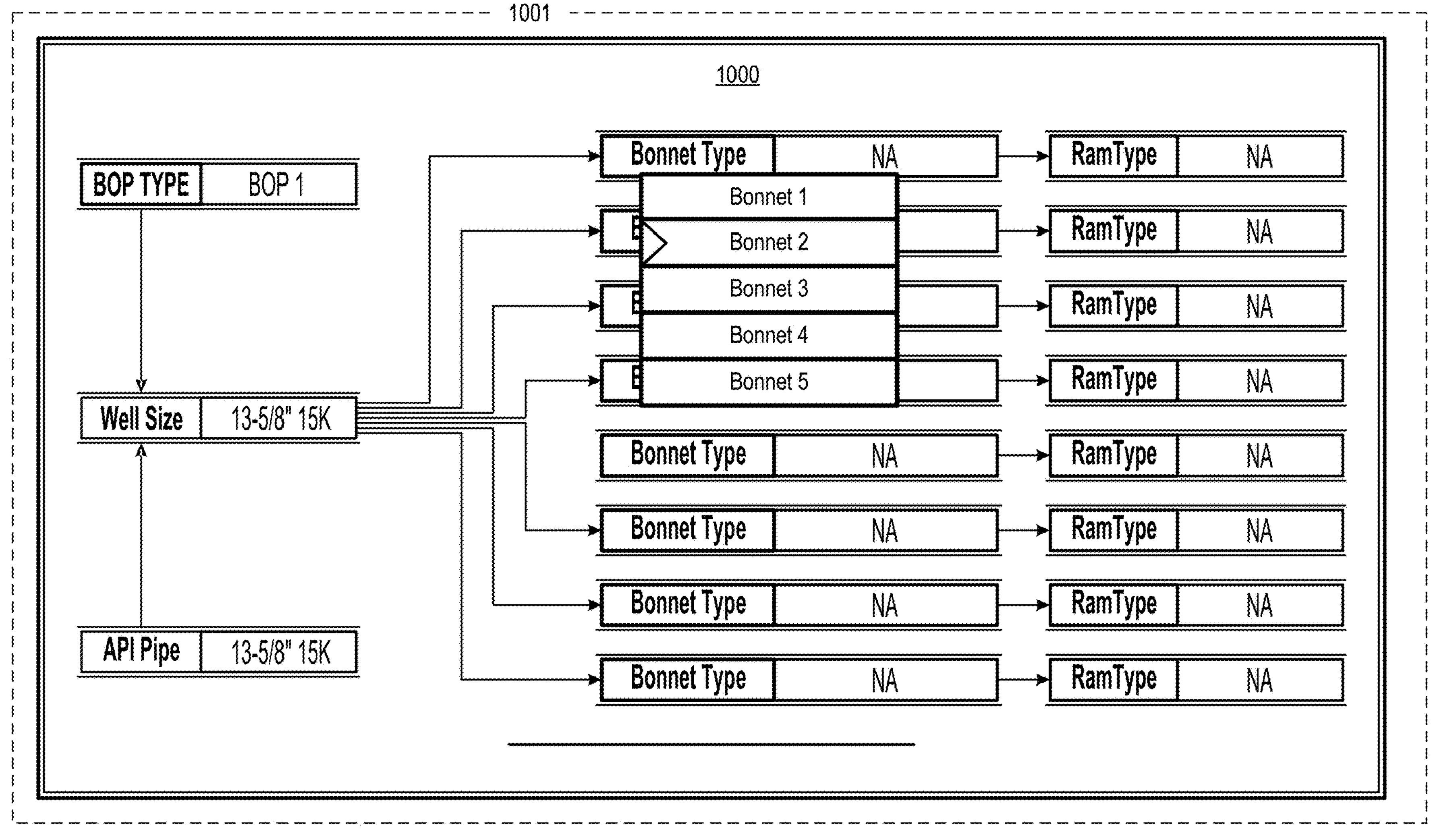
FIG. 10 illustrates an example of a graphical user interface.

FIG. 10 shows an example GUI 1000 that includes various features of the GUI 900 of FIG. 9 and that further includes a dropdown menu for a selected one of the bonnet type graphical controls where a dashed box represents a display screen or portion thereof 1001. As shown, the dropdown menu can include various types of bonnets, listed as Bonnet 1 to Bonnet 5. As an example, one or more types of bonnets may include, for example, one or more of standard bore, large bore, large bore tandem, FXT and annular types of bonnets. As explained, a bonnet or bonnets may couple to a body where at least a portion of a ram assembly may be disposed within a cavity of a bonnet. In the example of FIG. 10, the menu items can correspond to bonnet types that comport with the well size, which as mentioned, can depend on selection of a particular standard (e.g., API pipe, etc.). For example, consider a framework that can access logic that operates based on input such as, for example, the selection of BOP 1. In such an example, logic-based output can include a list of compatible items such as, for example, the types of bonnets listed as Bonnet 1 to Bonnet 5.

As an example, a GUI can include dropdown menus for selection of ram types. For example, each of the ram type graphical controls can include a dropdown menu that is populated according to operation of one or more other graphical controls (e.g., as to BOP type, well size, standard of pipe, etc.). In such an example, a framework may implement logic that may operate on input such as, for example, a selection of Bonnet 2, where logic-based output includes a list of compatible ram types.

FIG. 11 shows an example of a data structure 1100 that includes various columns that relate equipment and well bore sizes. For example, consider type of bonnet, well bore size availability and type of ram. As to types of rams, consider, for example, one or more of a blind ram, a pipe ram, a variable bore ram, a shearing blind ram, a H2S compatible ram, a dual string interlocking shear ram, etc.

In the example of FIG. 11, the data structure 1100 may be automatically populated by accessing data in one or more catalogs, databases, etc. As shown, the data structure 1100 includes logic that indicates whether or not certain equipment is available for a well bore size, a type of bonnet, etc. The data structure 1100 can be generated by a framework for utilization in control of one or more GUIs. For example, consider a GUI that can be generated based on the logic in the data structure 1100. In such an approach, the GUI can be operated in a logical manner that can streamline interactions of a user, for example, when configuring a system of equipment. In such an approach, where a user selects a well bore size and a type of bonnet, types of rams may be limited to those that are available or otherwise compatible with the well bore size and the type of bonnet (e.g., for a particular well operator, service provider, etc.). As explained, equipment listings in a GUI may be driven by one or more standards to help assure that a configured system comports with a standard that is applied to a field site.

FIG. 12 shows an example of a data structure 1200 that includes BOP bonnets and well bore size information and corresponding logic. As an example, a framework may operate one or more GUIs according to one or more data structures to streamline workflows and/or provide assurances that configured systems of equipment have a sufficiently high likelihood of being buildable and implemented in the field for one or more particular purposes.

Figure 13:
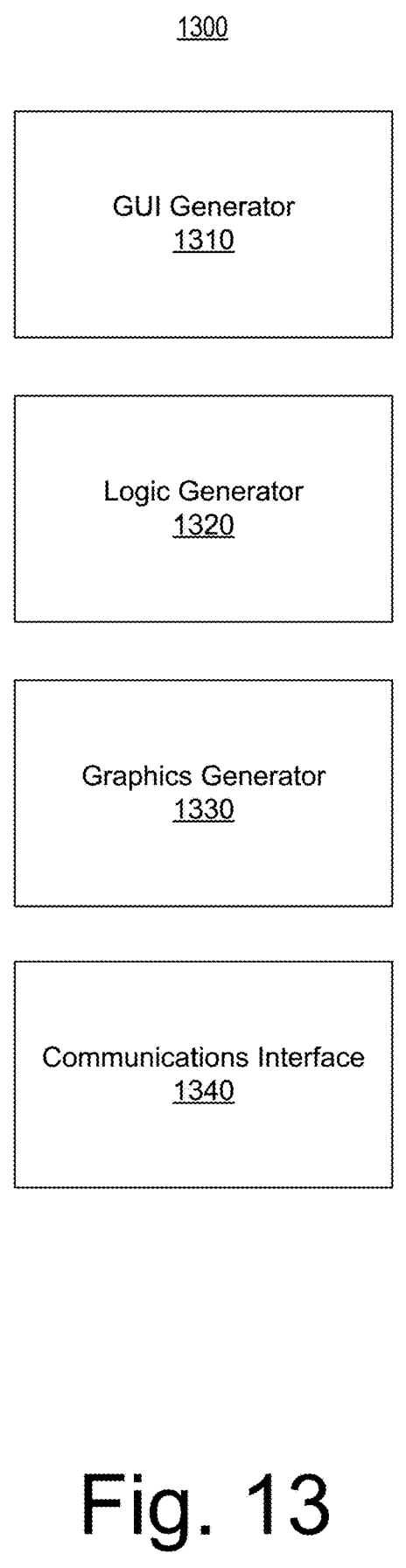

FIG. 13 shows an example of a framework 1300 that includes a GUI generator 1310, a logic generator 1320, a graphics generator 1330 and a communications interface 1340. In the example of FIG. 13, the GUI generator 1310 can generate various GUIs with graphics, graphical controls, etc. As explained, a GUI or GUIs can be generated in accordance with logic, which can be dynamically implemented, for example, responsive to one or more interactions (e.g., user selections, etc.).

As an example, the logic generator 1320 can generate logic using data from one or more databases, which can include equipment catalog databases and/or standards databases. For example, consider generation of logic by accessing API standards where such standards may provide for sizing and/or equipment compatibilities with respect to systems of equipment (see, e.g., the API arrangements of FIG. 4). As an example, a logic generator may access one or more configuration files where, for example, certain configurations may be more common. In such an approach, listings of menu items may be ordered accordance to how commonly they are utilized. In such an approach, a more commonly used type of equipment may be at the top of a list, which can conserve time for a user (e.g., rather than having to look through an entire list, scroll, etc.). As an example, the logic generator 1320 can provide for input of digitized documents (e.g., scanned documents subjected to optical character recognition (OCR)). In such an approach, various fields may be identified along with data, descriptions, etc., pertaining to various pieces of equipment. As an example, one or more types of natural language processing (NLP) techniques may be applied to extract relevant information for logic generation (e.g., equipment compatibilities, etc.). As an example, logic may be generated for one or more types of actuators, controllers, power supply systems, etc. As mentioned, equipment may be hydraulic, hybrid, electric, etc.

As an example, the graphics generator 1330 can provide for generating various types of graphics, which can include graphical representations of pieces of equipment, whether alone or in one or more assemblies. As an example, an equipment supplier may provide access to one or more databases of computer-aided design (CAD) drawings, which may be in one or more types of formats (e.g., SVG, GLB, glTF, etc.). As explained, a framework may utilize vector graphics for generation of renderings of pieces of equipment and assemblies thereof (e.g., a BOP stack, etc.). As an example, a framework may include or be operatively coupled to a database of vector graphics files for various pieces of equipment. For example, consider the 2D representations of FIG. 3 and FIG. 4. As explained, a framework may provide for 3D graphics such that a piece of equipment or assembly of pieces of equipment can be rendered and viewed in a perspective view, a cutaway view, etc., which can help to provide some assurances to a user that the equipment comports with what the user expects. As an example, graphics may be generated for one or more types of actuators, controllers, power supply systems, etc. As mentioned, equipment may be hydraulic, hybrid, electric, etc. As an example, graphics may be generated and suitable for use in monitoring, control, etc. In such an approach, a framework can provide for an end-to-end workflow with output suitable for use in tasks from design to field implementation, monitoring and control. For example, a framework can generate a control dashboard using graphics generated as part of a design workflow. As an example, the graphics generator 1330 may include one or more features of one or more technologies (e.g., OpenGL framework, GLB, glTF, WebGL, etc.).

As an example, a framework may generate instructions for rendering of a GUI where, for example, dynamic rendering of graphics may occur responsive to input received via one or more interactions with the GUI. As explained, features of one or more types of visualization frameworks may be utilized. For example, consider utilization of features associated with GLB and/or glTF. As an example, a GUI may be dynamically advanced on-the-fly responsive to one or more interactions to render graphics of equipment. For example, consider an interaction that selects a type of equipment where a graphics file can be accessed for that type of equipment and appropriately processed to render a representation of that type of equipment as part of an assembly. In such an example, code (e.g., script) may be executable to appropriately size and align graphics with one or more other graphics to thereby generate a graphical representation of an assembly of equipment (e.g., a BOP, etc.).

As an example, a graphic of equipment may be a vector graphic that is rendered to show a cut-away view of equipment. As explained with respect to the example assembly of equipment 380 of FIG. 3, various components may be assembled using flanges, which may utilize bolts. As an example, a ram assembly may be viewable at least in part via a cut-away view that slices through a bonnet. In such an example, an individual may be able to more readily identify one or more aspects of the ram assembly, along with one or more aspects of the bonnet and/or one or more aspects of a body, for example, where the ram assembly, bonnet and body are coupled together. As an example, a GUI may include one or more features for adjusting a view, which may be a cut-away view (e.g., consider adjusting one or more cutting planes, etc.).

As to the communications interface 1340, as explained, it may be utilized for receipt of transmissions, which may provide data as to one or more modes of framework operation. As an example, such an interface may operate according to one or more communication protocols and using one or more types of technology.

As an example, a computational framework can include a graphical user interface (GUI) generator; a logic generator; and a graphics generator; where the GUI generator generates a GUI for configuring a system of well equipment based on selections of graphical menu items, where the GUI dynamically responds to an interactive selection of one of the graphical menu items based on logic generated by the logic generator, and where the graphics generator generates a vector graphics representation of the system of well equipment (e.g., as configured).

As an example, output of such a computational framework may be directed to one or more other frameworks. For example, consider output for use by a planner (e.g., DRILLPLAN, etc.), an operations framework (e.g., DRILLOPS, etc.), etc. As an example, a framework may be interactive with one or more other frameworks. For example, consider interactions between a planner and a configuration framework, an operations framework and a configuration framework, etc. As explained, one or more controllers may utilize output of a configuration framework and/or be interactive with a configuration framework (e.g., consider hydraulic control, hybrid control, electric control, etc.).

Figure 14:
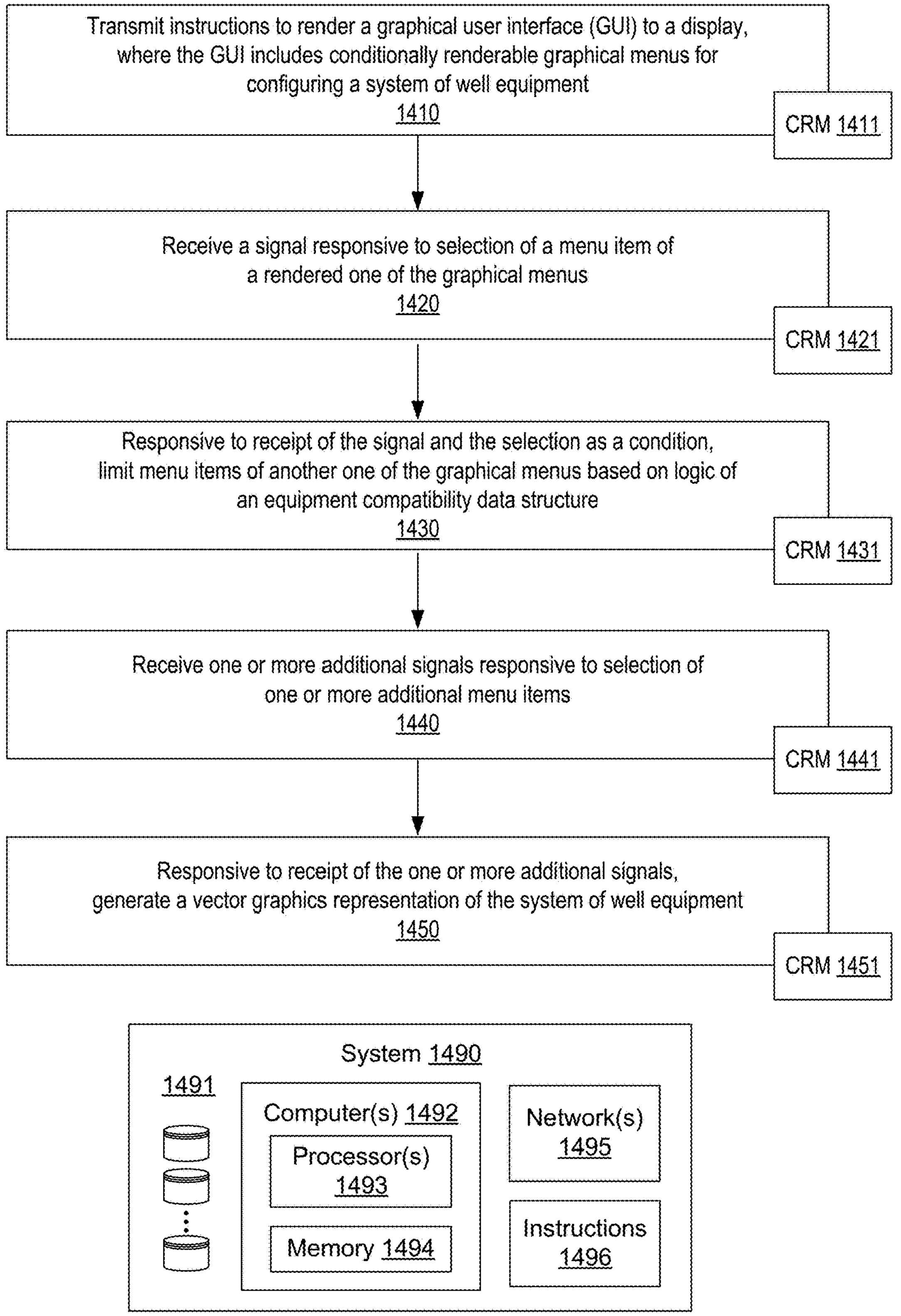
FIG. 14 illustrates an example of a method and an example of a system.

FIG. 14 shows an example of a method 1400 and an example of a system 1490. As shown, the method 1400 can include a transmission block 1410 for transmitting instructions to render a graphical user interface (GUI) to a display, where the GUI includes conditionally renderable graphical menus for configuring a system of well equipment; a reception block 1420 for receiving a signal responsive to selection of a menu item of a rendered one of the graphical menus; a limiting block 1430 for, responsive to receipt of the signal and the selection as a condition, limiting menu items of another one of the graphical menus based on logic of an equipment compatibility data structure; a reception block 1440 for receiving one or more additional signals responsive to selection of one or more additional menu items; and a generation block 1450 for, responsive to receipt of the one or more additional signals, generating a vector graphics representation of the system of well equipment (e.g., as configured).

As an example, output of such a method may be directed to one or more other frameworks. For example, consider output for use by a planner (e.g., DRILLPLAN, etc.), an operations framework (e.g., DRILLOPS, etc.), etc. As an example, a method may be interactive with one or more other methods, workflows, etc. For example, consider interactions between a planner and a method, an operations framework and a method, etc.

The method 1400 is shown in FIG. 14 in association with various computer-readable media (CRM) blocks 1411, 1421, 1431, 1441 and 1451. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1400. As an example, a computer-readable medium (CRM) may be a computer-readable storage medium that is non-transitory and that is not a carrier wave. As an example, one or more of the blocks 1411, 1421, 1431, 1441 and 1451 may be in the form processor-executable instructions.

In the example of FIG. 14, the system 1490, which may be a wellsite system, can include one or more information storage devices 1491, one or more computers 1492, one or more networks 1495 and instructions 1496. As to the one or more computers 1492, each computer may include one or more processors (e.g., or processing cores) 1493 and memory 1494 for storing the instructions 1496, for example, executable by at least one of the one or more processors 1493 (see, e.g., the blocks 1411, 1421, 1431, 1441 and 1451). As an example, a computer may include one or more network interfaces (e.g., wired or wireless), one or more graphics cards, a display interface (e.g., wired or wireless), etc.

Figure 15:
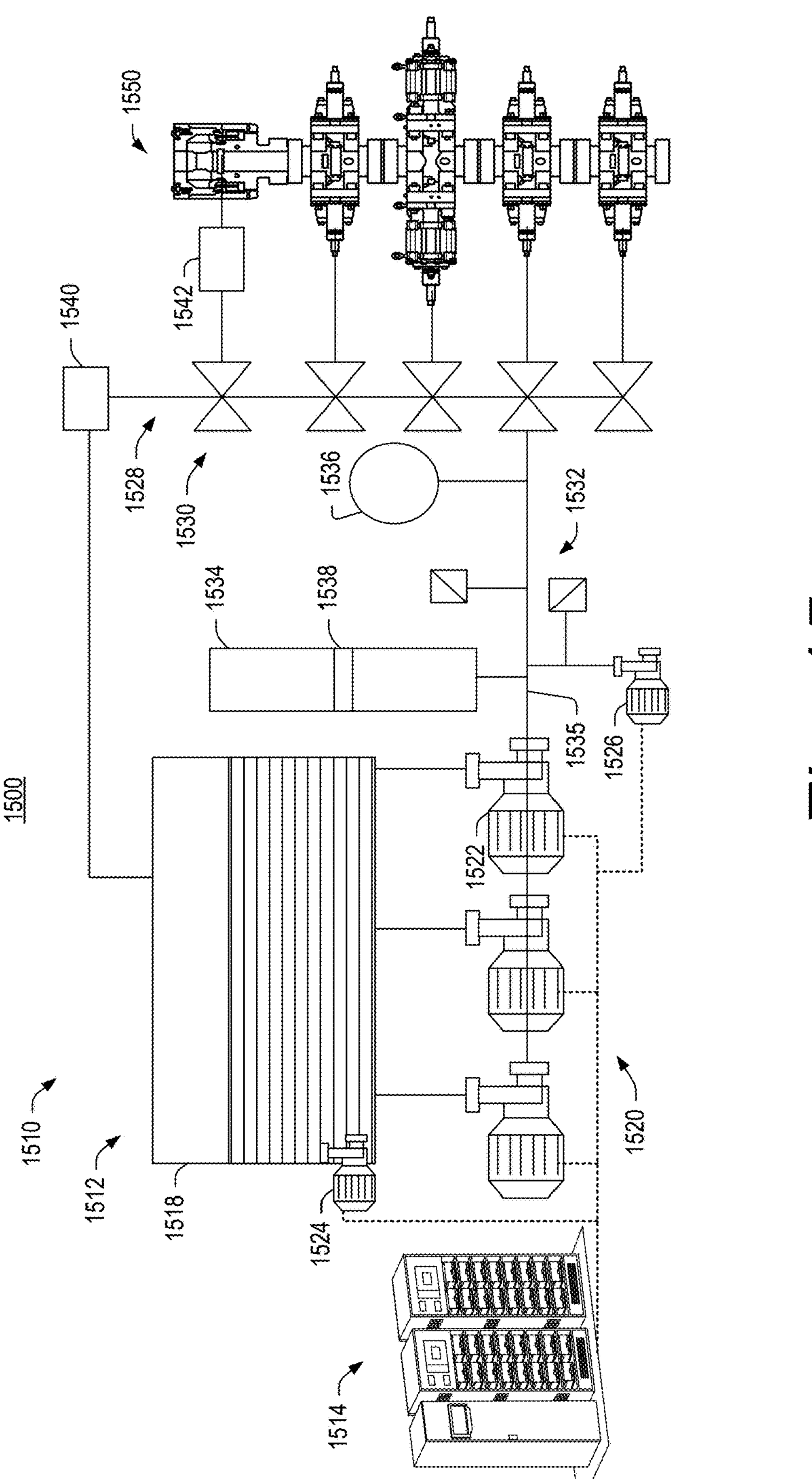
FIG. 15 illustrates an example of a system.

FIG. 15 shows an example of a system 1500 that can include a control system 1510 that may include a hybrid electric closing unit 1512, a battery system 1514 that can include a remote operator panel. As shown, the electric closing unit 1512 can includes at least a tank 1518, at least one primary pump 1520, a pneumatic pump 1526 (e.g., noting that an electric pump may be utilized), a valve manifold 1528, a pressure sensing system 1532, and a pressure storage reservoir 1534. As shown, the at least one primary pump 1520, the pressure storage reservoir 1534, the pressure sensing system 1532, and the valve manifold 1528 are hydraulically connected with the tank 1518 via a hydraulic circuit 1535. The at least one primary pump 1520 and the pneumatic pump 1526 may be powered by an electric energy source (see, e.g., dashed lines, which may be wired or wireless). As an example, the pneumatic pump 1526 may be powered by compressed air.

In FIG. 15, the tank 1518 of the hybrid electric closing unit 1512 can include a usable volume of the control system 1510. That is, the tank 1518 can include a usable volume of hydraulic fluid in accordance with applicable regulations, for example. The hybrid electric closing unit 1512 may include the at least one primary pump 1520 that is configured to pump hydraulic fluid from the usable volume of the tank 1518. The hybrid electric closing unit 1512 may also include at least one spare pump 1522 in addition to the at least one primary pump 1520. The spare pump 1522 may be hydraulically connected to the at least one primary pump 1520, the pressure storage reservoir 1534, the valve manifold 1528, and the pressure sensing system 1532 along the hydraulic circuit 1535, and the spare pump 1522 may be powered by an electric energy source. The spare pump 1522 may also be configured to pump hydraulic fluid from the usable volume of the tank 1518.

The hybrid electric closing unit 1512 may also include a recirculating pump 1524 attached to the tank 1518 for returning unused usable volume of hydraulic fluid back to the tank 1518. The recirculating pump 1524 may be powered by an electric energy source. Various pumps may be automatically and/or manually controlled, as to the latter, consider a scenario where the control system 1510 has lost local control either from a programmable logic controller (PLC) or embedded controller.

The hybrid electric closing unit 1512 may also include the valve manifold 1528 with a plurality of valves 1530. The plurality of valves 1530 of the valve manifold 1528 may be configured to operatively connect to a hydraulic device 1550, such as a BOP stack or other pressure control equipment. More specifically, each valve of the plurality of valves 1530 of the valve manifold 1528 may be configured to connect to a particular preventer or function on the BOP stack 1550. For example, consider connection to an annular preventer of the BOP stack 1550, connection to different ram preventers of the BOP stack 1550, which may include one or more shear rams, pipe rams, or blind rams, for example, for controlling a function of the BOP stack 1550.

As shown in FIG. 15, a pressure regulator 1542 may be disposed between the valve manifold 1528 and the hydraulic device 1550 or BOP stack. In this way, the plurality of valves 1530 may be functional valves having regulated outputs to predefined functions of the hydraulic device 1550 or BOP stack.

As shown in FIG. 15, the pneumatic pump 1526 is hydraulically connected to the at least one primary pump 1520, the pressure storage reservoir 1534, the valve manifold 1528, and the pressure sensing system 1532 along the hydraulic circuit 1535, and the pneumatic pump 1526 is powered by an electric energy source. The hydraulic fluid within the control system 1510 may have a predetermined static pressure. The pneumatic pump 1526 of the hybrid electric closing unit 1512 may function to maintain the control system 1510 at a predetermined static pressure.

According to one or more embodiments of the present disclosure, a predetermined static pressure of the control system 1510 may be approximately 3,000 psi, for example. However, the static pressure of the control system 1510 may be at a different pressure level. The control system 1510 may also include a pressure gauge 1536 connected to the hydraulic circuit 1535 for monitoring pressure in the control system 1510. The pneumatic pump 1526 may have an automatic and manual setting whereby a user can turn on the pneumatic pump 1526 manually in case the control system 1510 has lost local control either from the PLC or embedded controller.

The hybrid electric closing unit 1512 may also include a pressure sensing system 1532 disposed between the at least one primary pump 1520 and the valve manifold 1528. The pressure sensing system 1532 may manage a start-stop operation of the at least one primary pump 1520. The pressure sensing system 1532 may include a first pressure sensor and a second pressure sensor (see, e.g., blocks with crosslines), each hydraulically connected via the hydraulic circuit 1535. The pressure sensing system 1532 may include a pressure switch or a pressure transducer that, for example, provides a first electric signal to start the at least one primary pump 1520 when the hydraulic fluid within the control system 1510 drops to at least a first pressure below the predetermined static pressure. Such a pressure drop in the control system 1510 may be monitored by the pressure gauge 1536 connected to the hydraulic circuit 1535. A first pressure sensor may be configured to stop or turn off when hydraulic fluid within the control system 1510 returns to the predetermined static pressure. As to a second pressure sensor, it may be configured to provide a second electric signal to start the pneumatic pump 1526 when hydraulic fluid within the control system 1510 drops to at least a second pressure below the predetermined static pressure. Such a pressure drop in the control system 1510 may be monitored by the pressure gauge 1536 connected to the hydraulic circuit 1535. Such a second pressure sensor may be configured to stop or turn off when the hydraulic fluid within the control system 1510 returns to the predetermined static pressure.

The hybrid electric closing unit 1512 may include a pressure storage reservoir 1534, which may be a piston accumulator or a bladder accumulator, for example. The pressure storage reservoir 1534 may include a movable member 1538 that separates a charged-gas section filled with an inert gas (e.g., nitrogen) and a hydraulic-fluid section filled with hydraulic fluid, for example, connected to the hydraulic circuit 1535 so that the hydraulic fluid may be used to operate the hydraulic device 1550, such as a component of a BOP stack or other well equipment. As hydraulic fluid is discharged from the fluid section, the movable member 1538 moves within the pressure storage reservoir 1534 under pressure from the gas to maintain pressure on the remaining hydraulic fluid until full discharge. Thus, as hydraulic fluid is discharged from the fluid section, the movable member 1538 moves, making the gas section larger and the fluid section smaller. Alternatively, the pressure storage reservoir 1534 may include an elastomer bladder filled with an inert gas disposed in a pressure vessel containing hydraulic fluid. When the pressure drops in the control system 1510, the compressed gas in the bladder of the pressure storage reservoir 1534 expands and pushes the stored hydraulic fluid into the hydraulic circuit 1535 so that the hydraulic fluid may be used to operate the hydraulic device 1550.

The hybrid electric closing unit 1512 may also include components for regulating hydraulic pressure 1540 hydraulically connected to the valve manifold 1528, for example, where such an approach can return hydraulic fluid to the tank 1518 if a pressure of the control system 1510 exceeds the predetermined static pressure of the control system 1510. As to components, consider one or more of a bypass regulator, a backpressure regulator, a relief valve, a variable displacement pump, a variable speed motor, or other equivalent structures that either actively or passively control the hydraulic fluid flowing through the valve manifold 1528, for example.

In the example of FIG. 15, electric energy source of the control system 1510 may include at least one of rig power, a rig generator, an uninterruptable power supply (UPS), and at least one battery system, alone or in any combination, without departing from the scope of the present disclosure. According to one or more embodiments of the present disclosure, the electric energy source of the control system 1510 may include rig power as a primary energy source, at least one rig generator as a secondary energy source, and at least one battery system 1514 as the tertiary energy source, for example. Alternatively, the at least one battery system 1514 may be the primary energy source of the control system 1510, and the rig power may be the secondary energy source of the control system 1510, according to one or more embodiments of the present disclosure. Designations of primary, secondary, and tertiary energy sources are not limiting, however, and may change according to the needs of the control system 1510 according to one or more embodiments of the present disclosure. According to one or more embodiments of the present disclosure, the at least one battery system 1514 is trickle charged by a rig providing the rig power, for example.

As an example, the least one primary pump 1520 of the control system 1510 may operate at full force, as the pressure regulator 1542 manages the system pressures that are ultimately applied to a component, for example. When the pressure of the control system 1510 drops to at least the first pressure below the predetermined static pressure, such as to 2,500 psi, for example, the first pressure sensor of the pressure sensing system 1532 may start or turn on, which starts or turns on the at least one primary pump 1520. If the at least one primary pump 1520 fails to turn on, the spare pump 1522 may be turned on instead. The pumping action from the at least one primary pump 1520 and/or the spare pump 1522 pumps hydraulic fluid from the tank 1518 into the hydraulic circuit 1535, thereby increasing the pressure of the control system 1510. As hydraulic fluid from the tank 1518 is pumped into the hydraulic circuit 1535, the pressure storage reservoir 1534 is able to recharge with hydraulic fluid. When the pressure in the control system 1510 is restored to the predetermined static pressure, which may be 3000 psi, for example, the first pressure sensor stops or turns off. As an example, a method can include venting hydraulic fluid into the tank 1518 via the bypass regulator 1540 when the hydraulic fluid within the control system 1510 exceeds the predetermined static pressure. Pumping action from the at least one primary pump 1520 and/or the spare pump 1522 may continue for a predetermined time after the control system 1510 is restored to the predetermined static pressure. For example, pumping action from the at least one primary pump 1520 and/or the spare pump 1522 may continue for five seconds after the control system 1510 is restored to the predetermined static pressure. However, this predetermined time of five seconds is non-limiting, and other times are contemplated and are within the scope of the present disclosure.

As an example, the control system 1510 may include a remote operator panel. A remote operator panel may be located away from the hydraulic device 1550 connected to the control system 1510, which may be a BOP stack. For example, it may be located in a drilling cabin, in a tool pusher's cabin, or on the drilling floor, for example. A remote operator panel may facilitate remote operation of the control system 1510, according to one or more embodiments of the present disclosure.

As an example, starting and stopping of one or more pumps of the control system 1510 may be controlled by valve function either via a remote operator panel, an HMI, etc. A proximity sensor on a valve of the valve manifold 1528 or an HMI function may trigger pumps to start and stop, according to one or more embodiments of the present disclosure. Moreover, pressure and flow through the control system 1510 may be controlled by a predefined function. For example, if an annular function is fired, the control system 1510 can auto-regulate the pump output to 1,500 psi, for example, and stop the flow when the pressure reaches the predetermined static level. There may be a gallon count for each function, according to one or more embodiments of the present disclosure, for example.

As an example, certain automatic safety operations may be integrated into the control system 1510. For example, if the control system 1510 loses power, a Deadman auto shear safety operation may automatically function, causing communications and hydraulic supply of the control system 1510 to fire a predetermined set of functions to close in the well. As another example, in the case of a well control event, an operator can signal a function from either a push button or the HMI that will trigger a predetermined sequence of events for an emergency sequencing automatic function. As another example, in the case of a detected kick, the control system 1510 according to one or more embodiments of the present disclosure may turn on the pumping system and sequence the automated system to function the BOP stack.

As explained, the control system 1510 may include a battery system 1514 for supplying electric energy to at least the pumps 1520, 1522 and 1524 of the control system 1510. A battery system may be connected to various components. For example, a battery system may be connected to a pump, as previously described, an electric actuator, or even an electric BOP, for example, for supplying electric energy to these components. As an example, a battery system may include an enclosure or a plurality of battery enclosures, for example. In one or more embodiments of the present disclosure, a single battery enclosure may operate as a standalone battery system, or a plurality of battery enclosures may be connected to each other, for example, in an interconnected battery system.

As an example, a battery system may include a battery management system and a plurality of battery packs, for example. A battery management system may include an HMI and an associated processor for receiving and displaying data regarding battery charge, battery health, whether a battery is online for communication, and potential alarm conditions, for example. According to one or more embodiments of the present disclosure, HMI displays or LED lights of a battery management system may trend and monitor overall charge of a battery system. According to one or more embodiments of the present disclosure, a battery management system may be capable of monitoring a battery system down to the battery cell level. As an example, a battery management system may be configured to manage equipment inclination, vibration, shock, static, intermittent temperatures, and long-term battery health in accordance with one or more embodiments of the present disclosure.

As explained, a computational framework can include a graphical user interface (GUI) generator; a logic generator; and a graphics generator; where, for example, the GUI generator generates a GUI for configuring a system of well equipment based on selections of graphical menu items, where the GUI dynamically responds to an interactive selection of one of the graphical menu items based on logic generated by the logic generator, and where the graphics generator generates a vector graphics representation of the system of well equipment as configured. In such an example, a GUI may render a representation of equipment, which may, for example, be presented in one or more GUIs, HMIs, etc. For example, the system 1500 of FIG. 15 may be rendered as a GUI and/or an HMI where the hydraulic device 1550 is generated by a computational framework, along with one or more indications for control (e.g., electrical control, hydraulic control, electrical and hydraulic control, etc.). While the hydraulic device 1550 is referred to as being hydraulic, hydraulic may refer to well control (e.g., fluid control). As mentioned, the hydraulic device 1550 may include one or more types of components, which may be electric components, hydraulic components and/or hydroelectric components.

As an example, the system 1500 of FIG. 15 may include one or more features of one or more of the systems of FIG. 1, FIG. 2, FIG. 3 and/or FIG. 4. For example, the system 1500 may be installed at a site where, for example, there may be one or more instances of the hydraulic device 1550 (e.g., one for each wellhead, etc.).

As an example, a system, a framework, a method, etc., may utilize one or more machine learning (ML) features, which can be implemented using one or more ML models. As to types of ML models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked autoencoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, a system may utilize one or more recurrent neural networks (RNNs). One type of RNN is referred to as long short-term memory (LSTM), which can be a unit or component (e.g., of one or more units) that can be in a layer or layers. A LSTM component can be a type of artificial neural network (ANN) designed to recognize patterns in sequences of data, such as time series data. When provided with time series data, LSTMs take time and sequence into account such that an LSTM can include a temporal dimension. For example, consider utilization of one or more RNNs for processing temporal data from one or more sources, optionally in combination with spatial data. Such an approach may recognize temporal patterns, which may be utilized for making predictions (e.g., as to a pattern or patterns for future times, etc.).

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system-based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a computational framework can include a graphical user interface (GUI) generator; a logic generator; and a graphics generator; where the GUI generator generates a GUI for configuring a system of well equipment based on selections of graphical menu items, where the GUI dynamically responds to an interactive selection of one of the graphical menu items based on logic generated by the logic generator, and where the graphics generator generates a vector graphics representation of the system of well equipment as configured.

As an example, a system of well equipment may include a blowout preventer (BOP) system. For example, consider a BOP system that includes a well size, where, upon interactive selection of the well size via a GUI, the GUI dynamically responds by limiting items of one or more graphical menus to types of bonnets based on the logic generated by the logic generator. In such an example, the BOP system can include one of the types of bonnets, where, upon interactive selection of the one of the types of bonnets via the GUI, the GUI dynamically responds by limiting items of one or more graphical menus to types of rams based on the logic generated by the logic generator. As explained, a graphics generator may also respond dynamically to a selection, for example, by generating a representation of equipment. For example, consider a vector graphics representation of equipment, which may be amenable to rendering as a cut-away view.

As an example, a graphics generator may access one or more vector graphics files responsive to an interactive selection of a type of equipment via a GUI. In such an example, a file may be a file associated with one or more types of technologies such as, for example, GLB and/or glTF. As explained, a framework may provide for shaping, sizing, aligning, etc., one or more graphics with respect to one or more other graphics. For example, consider one or more of shaping, sizing, and aligning of a bonnet graphic with a body graphic, a ram assembly graphic with a bonnet graphic and/or a body graphic, etc.

As an example, a graphics generator may access one or more vector graphics files responsive to actuation of a graphical control of a GUI after configuring a system of well equipment.

As an example, a graphics generator may generate 2D vector graphics. As an example, a graphics generator may generate 3D vector graphics. As an example, a graphics generator may generate 2D and/or 3D vector graphics. As an example, a graphics generator may generate one or more cut-away views of an assembly of equipment where such an assembly may be configured via a GUI-driven workflow that is dynamically controlled at least in part by logic as to suitable types of equipment to form the assembly.

As an example, a computational framework may include a communications interface. For example, consider a GUI generator that generates a GUI responsive to receipt of a communication via the communications interface.

As an example, a GUI generator may generate executable instructions for transmission to a computing device via a network for rendering of the GUI by the computing device. As an example, one or more instructions may be operable using technology such as, for example, WebGL technology.

As an example, graphical menu items may include items for one or more of hydraulic equipment, hydraulic and electric equipment, and electric equipment. In such an example, a graphics generator may generate vector graphics representation of a system of well equipment with associated control indicia for one or more of hydraulic control, hydraulic and electric control, and electric control. In such an example, output from a framework may provide for expediting control of field equipment, constructing a field control system, ordering of components for a field control system, simulating performance of a field control system, etc.

As an example, a method can include transmitting instructions to render a graphical user interface (GUI) to a display, where the GUI includes conditionally renderable graphical menus for configuring a system of well equipment; receiving a signal responsive to selection of a menu item of a rendered one of the graphical menus; responsive to receipt of the signal and the selection as a condition, limiting menu items of another one of the graphical menus based on logic of an equipment compatibility data structure; receiving one or more additional signals responsive to selection of one or more additional menu items; and responsive to receipt of the one or more additional signals, generating a vector graphics representation of the system of well equipment as configured. In such an example, the method can include transmitting instructions to render the vector graphics representation of the system of well equipment. As an example, a method can include generating equipment compatibility data structure based at least in part on data in an American Petroleum Institute (API) specification. As an example, a method can include generating a vector graphics representation of a system of well equipment at least in part by accessing a database of vector graphics files of different pieces of well equipment (e.g., consider .svg, .glb, .glTF, etc., types of files).

As an example, a system of well equipment can include a number of preventers that are stacked to form a blowout preventer (BOP) system for well control. In such an example, a method can include generating vector graphics representation of the system of well equipment by at least in part generating vector graphics representations for control indicia for one or more of hydraulic control, hydraulic and electric control, and electric control.

As an example, one or more computer-readable storage media can include processor-executable instructions to instruct a computing system to: transmit instructions to render a graphical user interface (GUI) to a display, where the GUI includes conditionally renderable graphical menus for configuring a system of well equipment; receive a signal responsive to selection of a menu item of a rendered one of the graphical menus; responsive to receipt of the signal and the selection as a condition, limit menu items of another one of the graphical menus based on logic of an equipment compatibility data structure; receive one or more additional signals responsive to selection of one or more additional menu items; and responsive to receipt of the one or more additional signals, generate a vector graphics representation of the system of well equipment.

As an example, a computer program product can include one or more computer-readable storage media that can include processor-executable instructions to instruct a computing system to perform one or more methods and/or one or more portions of a method. Various example methods may be performed in various combinations.

Figure 16:
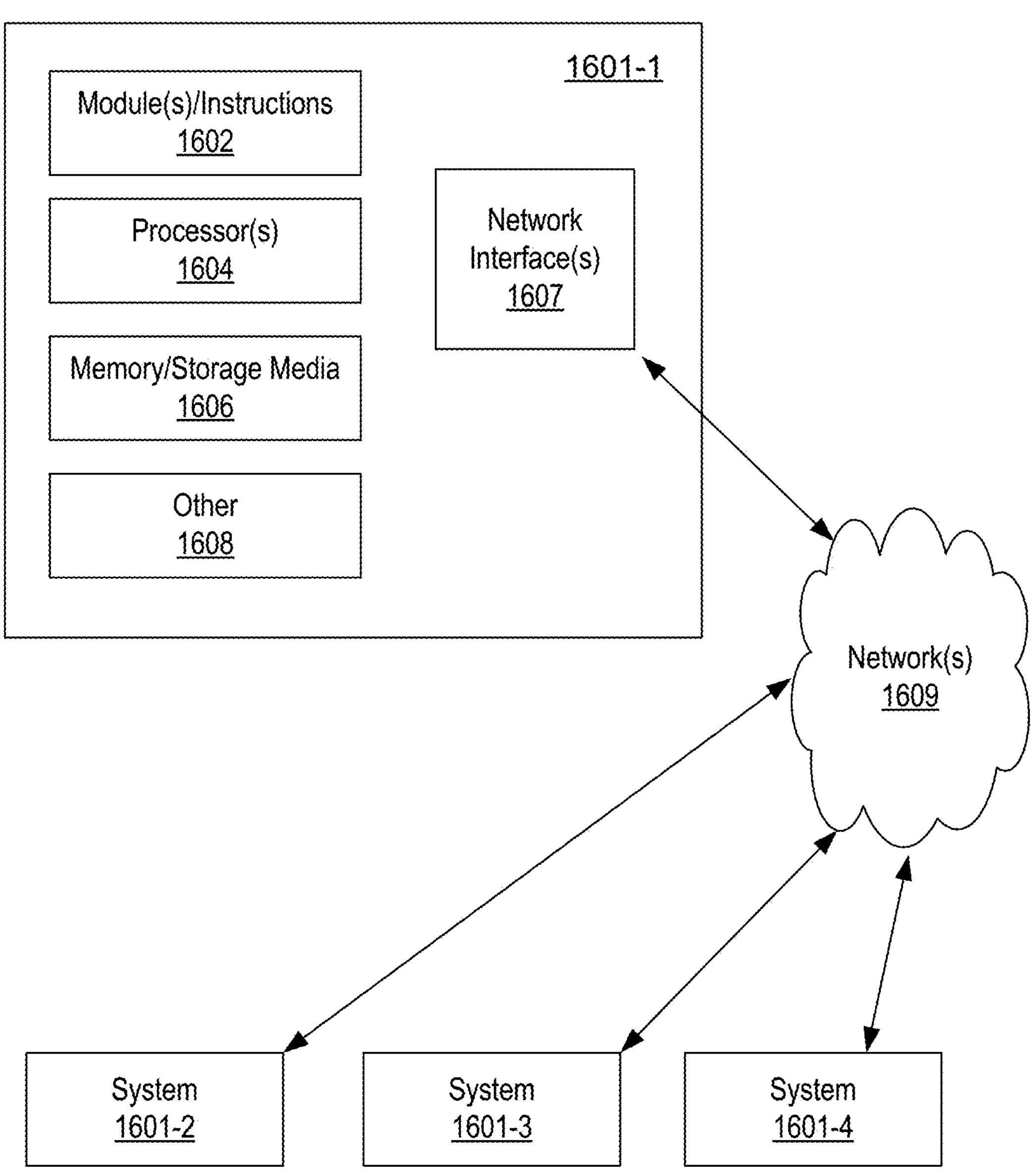
FIG. 16 illustrates examples of computer and network equipment.

In some embodiments, a method or methods may be executed by a computing system. FIG. 16 shows an example of a system 1600 that can include one or more computing systems 1601-1, 1601-2, 1601-3 and 1601-4, which may be operatively coupled via one or more networks 1609, which may include wired and/or wireless networks; noting that one or more other features 1608 can be included in the system 1600.

As an example, a system can include an individual computer system or an arrangement of distributed computer systems. In the example of FIG. 16, the computer system 1601-1 can include one or more modules 1602, which may be or include processor-executable instructions, for example, executable to perform various tasks (e.g., receiving information, requesting information, processing information, simulation, outputting information, etc.).

As an example, a module may be executed independently, or in coordination with, one or more processors 1604, which is (or are) operatively coupled to one or more storage media 1606 (e.g., via wire, wirelessly, etc.). As an example, one or more of the one or more processors 1604 can be operatively coupled to at least one of one or more network interface 1607. In such an example, the computer system 1601-1 can transmit and/or receive information, for example, via the one or more networks 1609 (e.g., consider one or more of the Internet, a private network, a cellular network, a satellite network, etc.).

As an example, the computer system 1601-1 may receive from and/or transmit information to one or more other devices, which may be or include, for example, one or more of the computer systems 1601-2, etc. A device may be located in a physical location that differs from that of the computer system 1601-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1606 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

Figure 17:
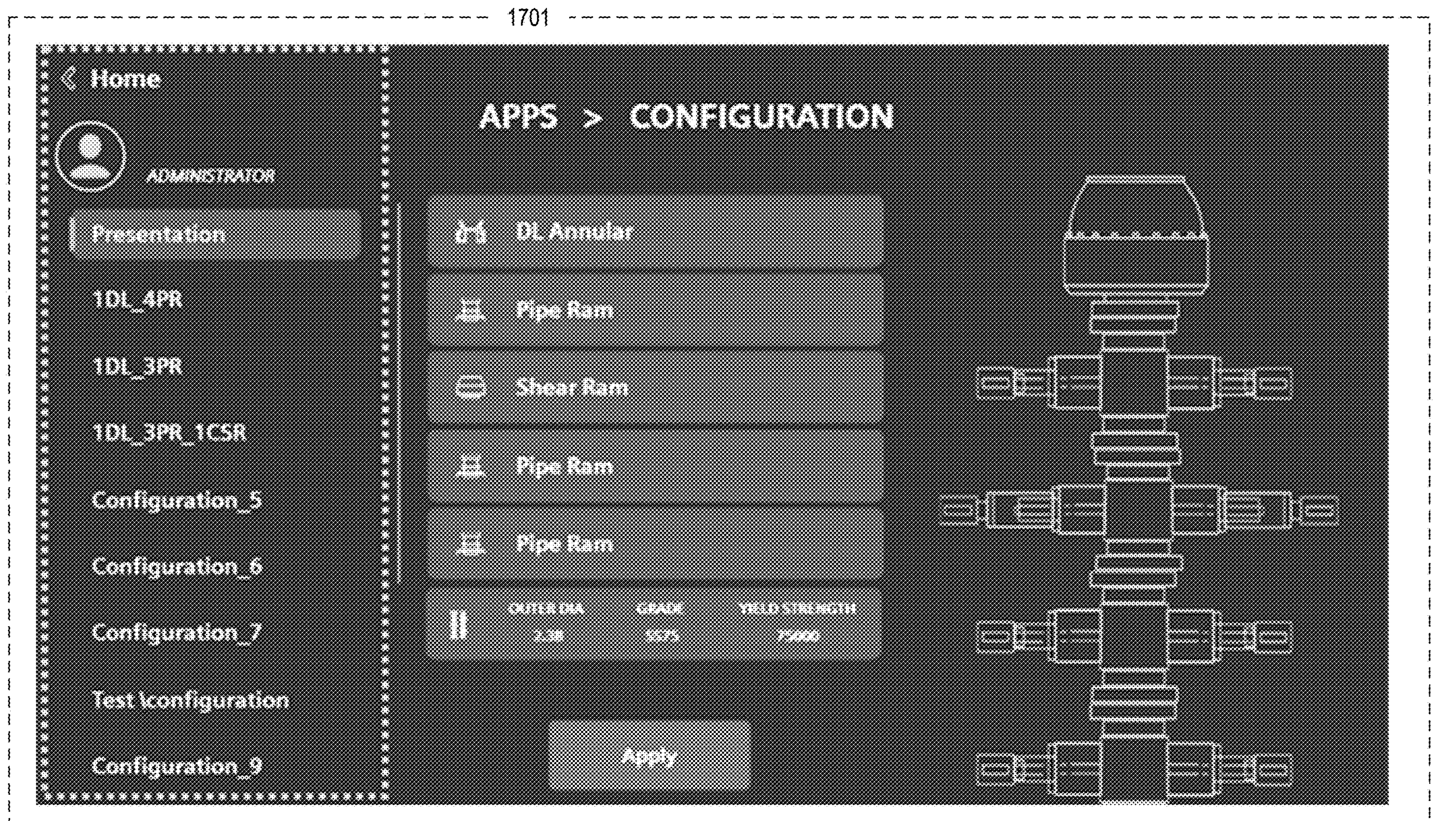
FIG. 17 illustrates a display screen or portion thereof with an example of a graphical user interface.

FIG. 17 illustrates a display screen or portion thereof with an example of a graphical user interface 1701.

Figure 18:
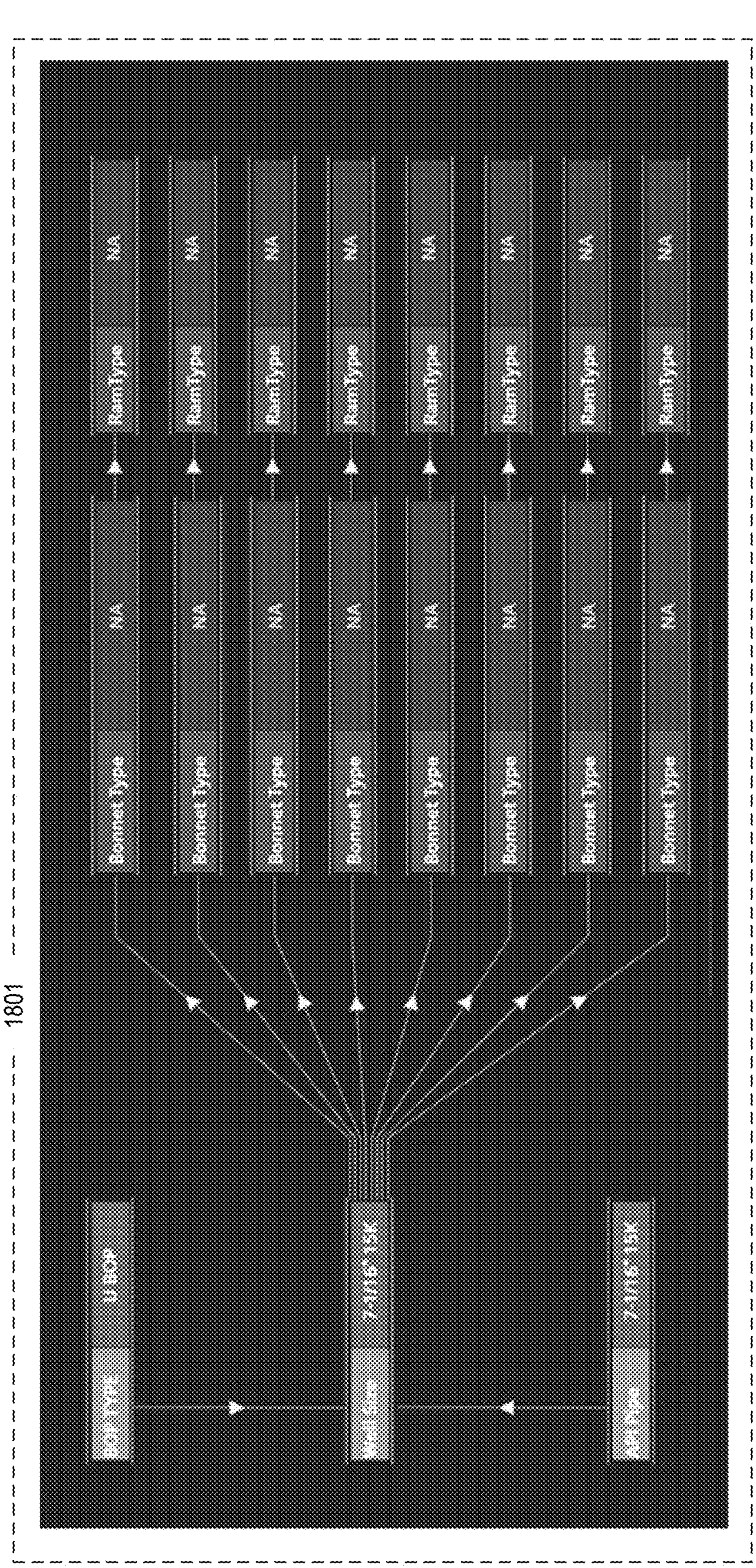
FIG. 18 illustrates a display screen or portion thereof with an example of a graphical user interface.

FIG. 18 illustrates a display screen or portion thereof with an example of a graphical user interface 1801.

Figure 19:
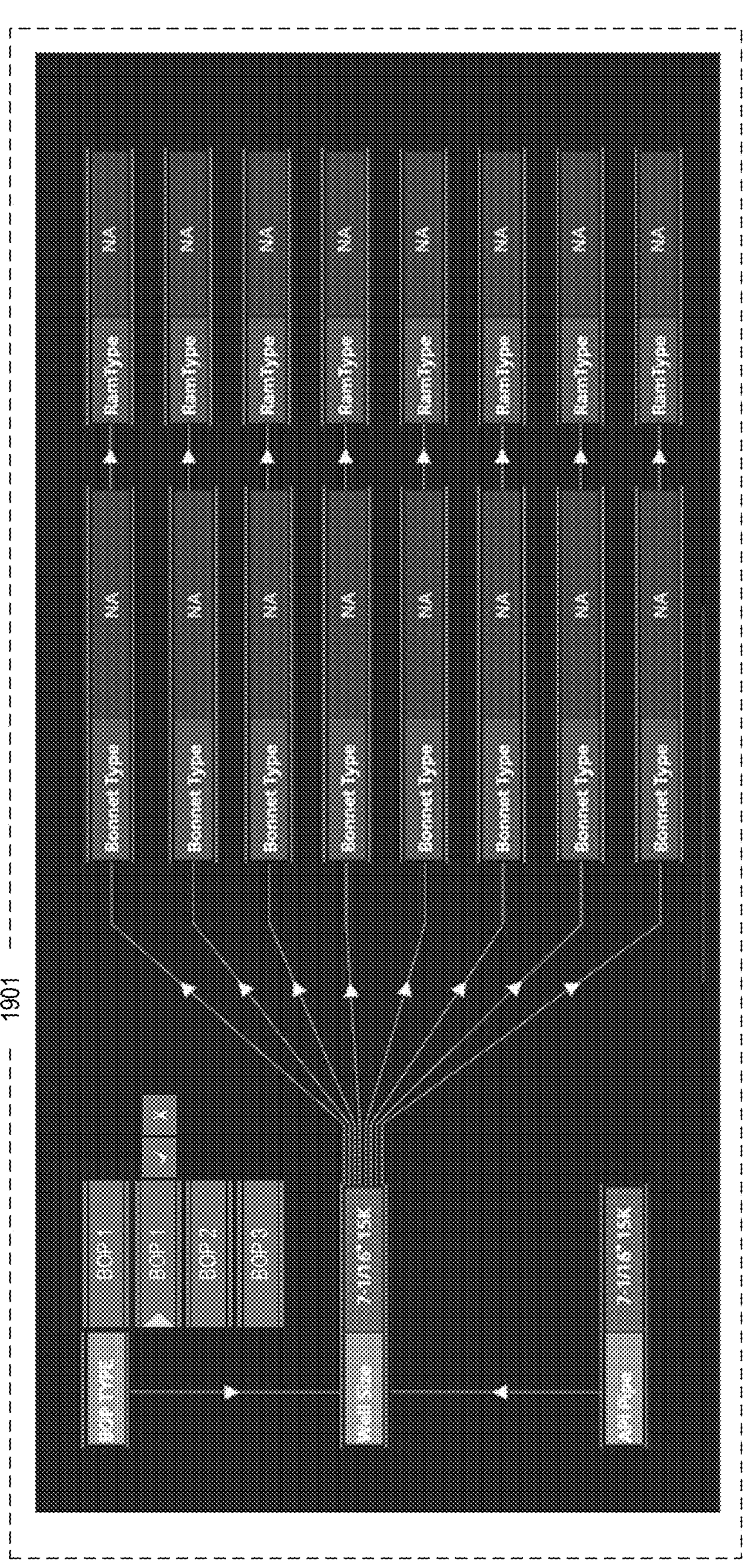
FIG. 19 illustrates a display screen or portion thereof with an example of a graphical user interface.

FIG. 19 illustrates a display screen or portion thereof with an example of a graphical user interface 1901.

Figure 20:
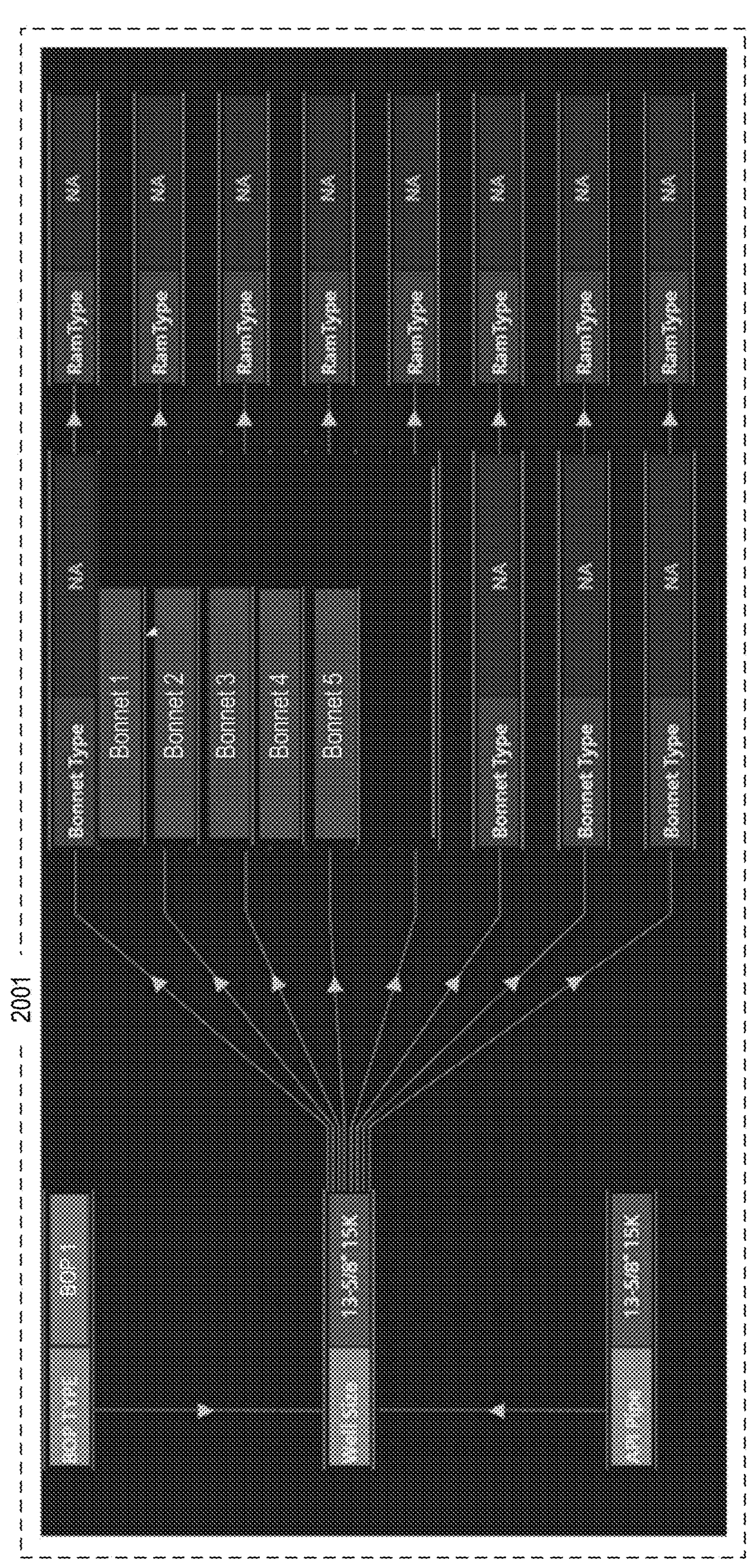
FIG. 20 illustrates a display screen or portion thereof with an example of a graphical user interface.

FIG. 20 illustrates a display screen or portion thereof with an example of a graphical user interface 2001.

In FIGS. 6, 7, 8, 9 and 10 and FIGS. 17, 18, 19 and 20, the outermost broken lines show a display screen or portion thereof, and form no part of the designs of the graphical user interfaces. Various subject matter illustrated in various figures herein may include a process or period in which an image changes into another image.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A system, comprising:
- a processor; and
- memory, wherein the memory stores computer-readable instructions that, when executed by the processor, cause the processor to:
  - generate, via a graphical user interface (GUI) generator, a GUI for designing a piece of wellhead equipment based on selections of graphical menu items from a graphical menu, wherein the graphical menu items comprise types of blowout preventers (BOP), types of bonnets, types of rams, a well size, or any combination thereof;
  - responsive to receipt of a first signal indicative of a selection of a particular graphical menu item of the graphical menu items:
    - populate an additional graphical menu with additional graphical menu items based on one or more configuration files that include a utilization frequency; and
    - omit from the additional graphical menu, one or more further graphical menu items based on an equipment compatibility data structure; and
    - responsive to receipt of a second signal indicative of an additional selection of one or more of the additional graphical menu items of the additional graphical menu, generate, via a graphics generator, a vector graphics cut-away representation of the piece of wellhead equipment as designed, wherein generating the vector graphics cut-away representation comprises dynamically sizing and spatially aligning a first vector graphic of a selected type of bonnet and a second vector graphic of a selected type of ram based on the selection and the additional selection to render a proposed assembly of the piece of wellhead equipment.

2. The system of claim 1, wherein the piece of wellhead equipment comprises a blowout preventer (BOP) system.

3. The system of claim 2, wherein the BOP system comprises the well size, wherein, upon interactive selection of the well size via the GUI, the GUI dynamically responds by limiting graphical menu items from the graphical menu to the types of bonnets.

4. The system of claim 3, wherein the BOP system comprises one of the types of bonnets, wherein, upon interactive selection of the one of the types of bonnets via the GUI, the GUI dynamically responds by limiting graphical menu items from the graphical menu to the types of rams.

5. The system of claim 1, wherein the graphics generator accesses one or more vector graphics files responsive to an interactive selection of a type of equipment via the GUI.

6. The system of claim 1, wherein the graphics generator accesses one or more vector graphics files responsive to actuation of a graphical control of the GUI after designing the piece of wellhead equipment.

7. The system of claim 1, wherein the graphics generator generates 2D vector graphics.

8. The system of claim 1, wherein the graphics generator generates 3D vector graphics.

9. The system of claim 1, further comprising a communications interface, wherein the GUI generator generates the GUI responsive to receipt of a communication via the communications interface.

10. The system of claim 1, wherein the GUI generator generates executable instructions for transmission to a computing device via a network for rendering of the GUI by the computing device.

11. The system of claim 1, wherein the graphical menu items comprise items for one or more of hydraulic equipment, hydraulic and electric equipment, and electric equipment.

12. The system of claim 11, wherein the graphics generator generates the vector graphics cut-away representation of the piece of wellhead equipment with associated control indicia for controlling one or more of a hydraulic control system, an electro-hydraulic system, and an electric control system of the designed piece of wellhead equipment.

13. The system of claim 1, wherein omitting from the additional graphical menu, one or more further graphical menu items comprises:
- limiting available types of bonnets based on a selected well bore size; and
- limiting available types of rams based on a selected type of bonnet.

14. The system of claim 1, wherein the vector graphics cut-away representation is configured to facilitate a determination that the piece of wellhead equipment as designed complies with a design prior to implementation.

15. The system of claim 1, wherein omitting from the additional graphical menu, one or more further graphical menu items comprises restricting selection of the wellhead equipment to comply with an American Petroleum Institute (API) pipe standard.

16. A method comprising:
- generating, via a graphical user interface (GUI) generator, a GUI for designing a piece of wellhead equipment based on selections of graphical menu items from a graphical menu, wherein the graphical menu items comprise types of blowout preventers (BOP), types of bonnets, types of rams, a well size, or any combination thereof;

responsive to receipt of a first signal indicative of a selection of a particular graphical menu item of the graphical menu items:

populating an additional graphical menu with additional graphical menu items based on one or more configuration files that include a utilization frequency; and omitting from the additional graphical menu, one or more further graphical menu items based on an equipment compatibility data structure; and responsive to receipt of a second signal indicative of an additional selection of one or more of the additional graphical menu items of the additional graphical menu, generating, via a graphics generator, a vector graphics cut-away representation of the piece of wellhead equipment as designed, wherein generating the vector graphics cut-away representation comprises dynamically sizing and spatially aligning a first vector graphic of a selected type of bonnet and a second vector graphic of a selected type of ram based on the selection and the additional selection to render a proposed assembly of the piece of wellhead equipment.

17. The method of claim 16, comprising generating the equipment compatibility data structure based at least in part on data in an American Petroleum Institute (API) specification.

18. The method of claim 16, wherein the generating the vector graphics cut-away representation of the piece of wellhead equipment comprises accessing a database of vector graphics files of different pieces of wellhead equipment.

19. The method of claim 16, wherein the piece of wellhead equipment comprises a number of preventers that are stacked to form a blowout preventer (BOP) system for well control, wherein the graphics generator generates the vector graphics cut-away representation of the piece of wellhead equipment with associated control indicia for controlling one or more of a hydraulic control system, an electro-hydraulic system, and an electric control system of the designed piece of wellhead equipment.

20. A tangible, non-transitory, computer-readable medium, comprising computer-readable instruction that, when executed by one or more processors of one or more computers, cause the one or more computers to:

generate, via a graphical user interface (GUI) generator, a GUI for designing a piece of wellhead equipment based on selections of graphical menu items from a graphical menu, wherein the graphical menu items comprise types of blowout preventers (BOP), types of bonnets, types of rams, a well size, or any combination thereof;

responsive to receipt of a first signal indicative of a selection of a particular graphical menu item of the graphical menu items:

populate an additional graphical menu with additional graphical menu items based on one or more configuration files that include a utilization frequency; and omit from the additional graphical menu, one or more further graphical menu items based on an equipment compatibility data structure; and responsive to receipt of a second signal indicative of an additional selection of one or more of the additional graphical menu items of the additional graphical menu, generate, via a graphics generator, a vector graphics cut-away representation of the piece of wellhead equipment, wherein generating the vector graphics cut-away representation comprises dynamically sizing and spatially aligning a first vector graphic of a selected type of bonnet and a second vector graphic of a selected type of ram based on the selection and the additional selection to render a proposed assembly of the piece of wellhead equipment.

* * * * *